US011048484B2

(12) United States Patent
Gunther, Jr. et al.

(10) Patent No.: US 11,048,484 B2
(45) Date of Patent: Jun. 29, 2021

(54) AUTOMATED RESPONSIVE GRID-BASED LAYOUT DESIGN SYSTEM

(71) Applicant: Oracle International Corporation, Redwood Shores, CA (US)

(72) Inventors: Richard E. Gunther, Jr., Summerfield, NC (US); Jan Pirek, Nelahozeves (CZ); Jan Peska, Slany (CZ); Miloslav Metelka, Sezemice (CZ); Ondrej Brejla, Prague (CZ)

(73) Assignee: Oracle International Corporation, Redwood Shores, CA (US)

( * ) Notice: Subject to any disclaimer, the term of this patent is extended or adjusted under 35 U.S.C. 154(b) by 567 days.

(21) Appl. No.: 15/093,821

(22) Filed: Apr. 8, 2016

(65) Prior Publication Data

US 2017/0102927 A1 Apr. 13, 2017

Related U.S. Application Data

(60) Provisional application No. 62/239,307, filed on Oct. 9, 2015.

(51) Int. Cl.
*G06F 9/44* (2018.01)
*G06F 8/38* (2018.01)
*G06F 3/0482* (2013.01)

(52) U.S. Cl.
CPC .............. *G06F 8/38* (2013.01); *G06F 3/0482* (2013.01)

(58) Field of Classification Search
None
See application file for complete search history.

(56) References Cited

U.S. PATENT DOCUMENTS

| 2008/0244422 A1* | 10/2008 | Hilgers | G06F 9/451 715/763 |
| 2013/0083053 A1* | 4/2013 | Milne | G06F 9/451 345/619 |
| 2015/0012818 A1* | 1/2015 | Reichmann | G06F 17/2247 715/236 |

(Continued)

OTHER PUBLICATIONS

Microsoft, "Visual Studio Light Switch", Visual Studio 2015, https://msdn.microsoft.com/en-us/library/ff851953.aspx, last downloaded on Mar. 31, 2016.

(Continued)

*Primary Examiner* — Tuan S Nguyen
(74) *Attorney, Agent, or Firm* — Potomac Law Group, PLLC

(57) ABSTRACT

A system provides user interface ("UI") layout design functionality. The system provides a canvas on a display, where the canvas is controlled by a grid that defines a first number of equally wide logical columns. The system then receives first user input for placing one or more panels on the canvas, where each panel is configured to horizontally occupy one or more of the first number of equally wide logical columns. The system further receives second user input for placing one or more UI components in each of the one or more panels. The system then creates a UI layout based on the first user input and the second user input. In one embodiment, each logical row in the canvas is split into equally wide logical columns, and each panel is controlled by a panel grid that also includes equally wide logical columns.

18 Claims, 30 Drawing Sheets

(56) References Cited

U.S. PATENT DOCUMENTS

2016/0335740 A1* 11/2016 Graf .................... G06F 16/9577

OTHER PUBLICATIONS

Weebly, "Weebly Website Builder: Create a Free Website, Store or Blog", http://www.weebly.com/, last downloaded on Mar. 31, 2016.
Uxpin, "Everything you ever wanted in a US Design Platform", https://www.uxpin.com/tour.html, last downloaded on Mar. 31, 2016.
IBM, "Rapid Apps on Bluemix—Build mobile and web applications with data in minutes", https://www.ibm.com/developerworks/community/blogs/enablingwithbluemix/entry/rapid_apps_on_bluemix_build_mobile_and_web_applications_with_data_in_minutes?lang=en, last downloaded on Mar. 31, 2016.
Adobe Dreamweaver CC, "Visually design and develop modern, responsive websites", http://www.adobe.com/products/dreamweaver.html, last downloaded on Mar. 31, 2016.
Microsoft, "About Expression Blend", Expression Studio 2.0, https://msdn.microsoft.com/en-us/library/cc296376.aspx, last downloaded on Mar. 31, 2016.
Zoho, "Online Office Suites and SaaS Applications for Businesses", https://www.zoho.com/, last downloaded on Mar. 31, 2016.
Divshot, "Static Web Hosting for Developers and Designers", https://divshot.com/, last downloaded on Mar. 31, 2016.
Jetstrap, "The Bootstrap Interface Builder", https://jetstrap.com/, last downloaded on Mar. 31, 2016.

* cited by examiner

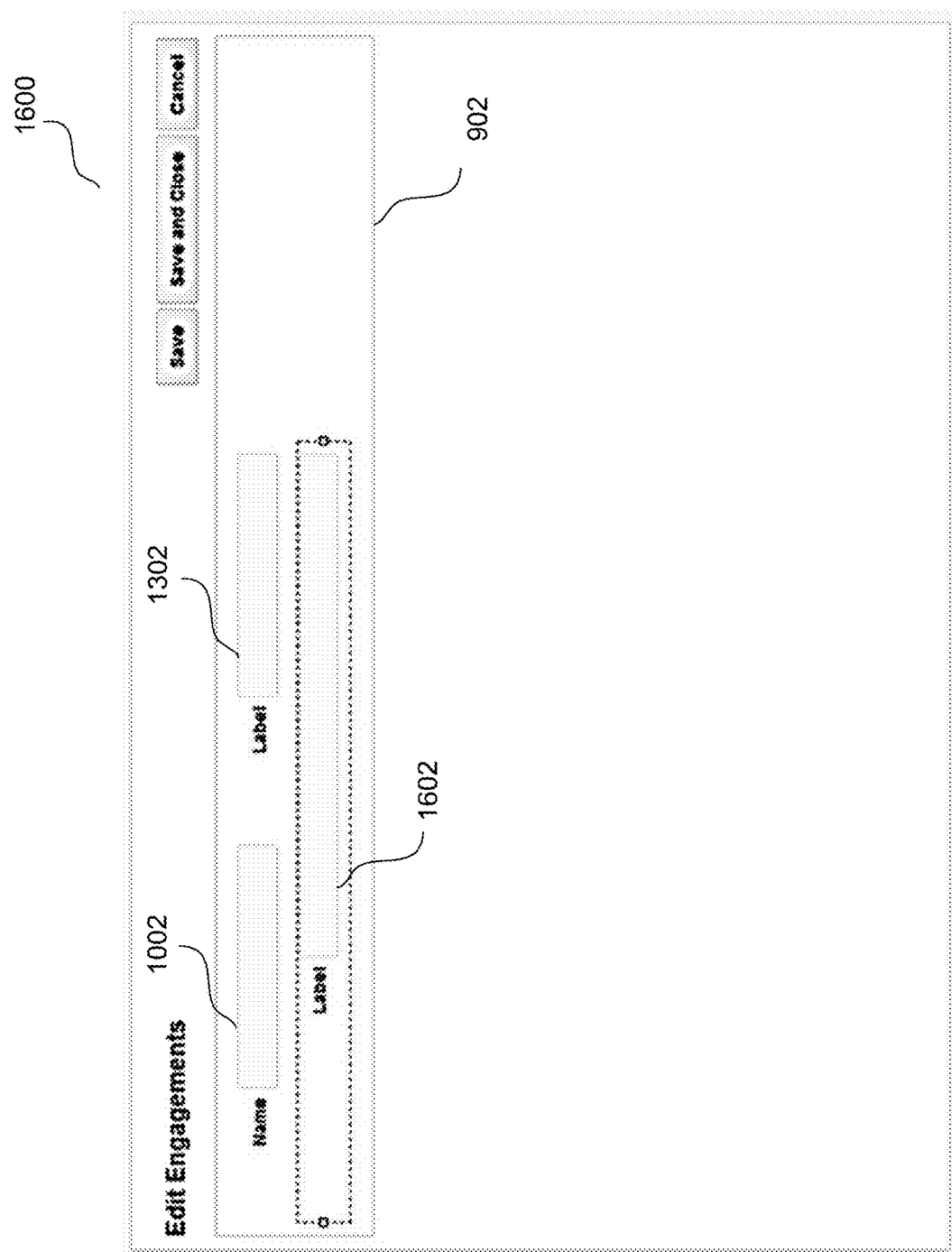

AUTOMATED RESPONSIVE GRID-BASED LAYOUT DESIGN SYSTEM

CROSS REFERENCE TO RELATED APPLICATIONS

This application claims priority of U.S. Provisional Patent Application Ser. No. 62/239,307, filed Oct. 9, 2015, entitled "Automated responsive grid-based layout system," the disclosure of which is hereby incorporated by reference.

FIELD

One embodiment is directed generally to application development, and in particular, to developing a user interface ("UI") for an application.

BACKGROUND INFORMATION

A user interface ("UI"), such as a web page, allows for interaction between humans and a machine/computer. A typical UI includes basic "elements" or "components" such as buttons, check boxes, dropdown lists, images, labels, radio buttons, text boxes, grids, etc. Generally, there are some development systems that facilitate the design of UIs. For example, some development systems provide templates of components such that a UI designer can drag and drop the components onto a UI work surface or "canvas" to create a UI.

SUMMARY

One embodiment is a system that provides user interface ("UI") layout design functionality. The system provides a canvas on a display, where the canvas is controlled by a grid that defines a first number of equally wide logical columns. The system then receives first user input for placing one or more panels on the canvas, where each panel is configured to horizontally occupy one or more of the first number of equally wide logical columns. The system further receives second user input for placing one or more UI components in each of the one or more panels. The system then creates a UI layout based on the first user input and the second user input. In one embodiment, each logical row in the canvas is split into equally wide logical columns, and each panel is controlled by a panel grid that also includes equally wide logical columns.

BRIEF DESCRIPTION OF THE DRAWINGS

FIGS. 2-31 illustrate example screens for providing layout design functionality according to embodiments of the present invention.

DETAILED DESCRIPTION

Figure 1:
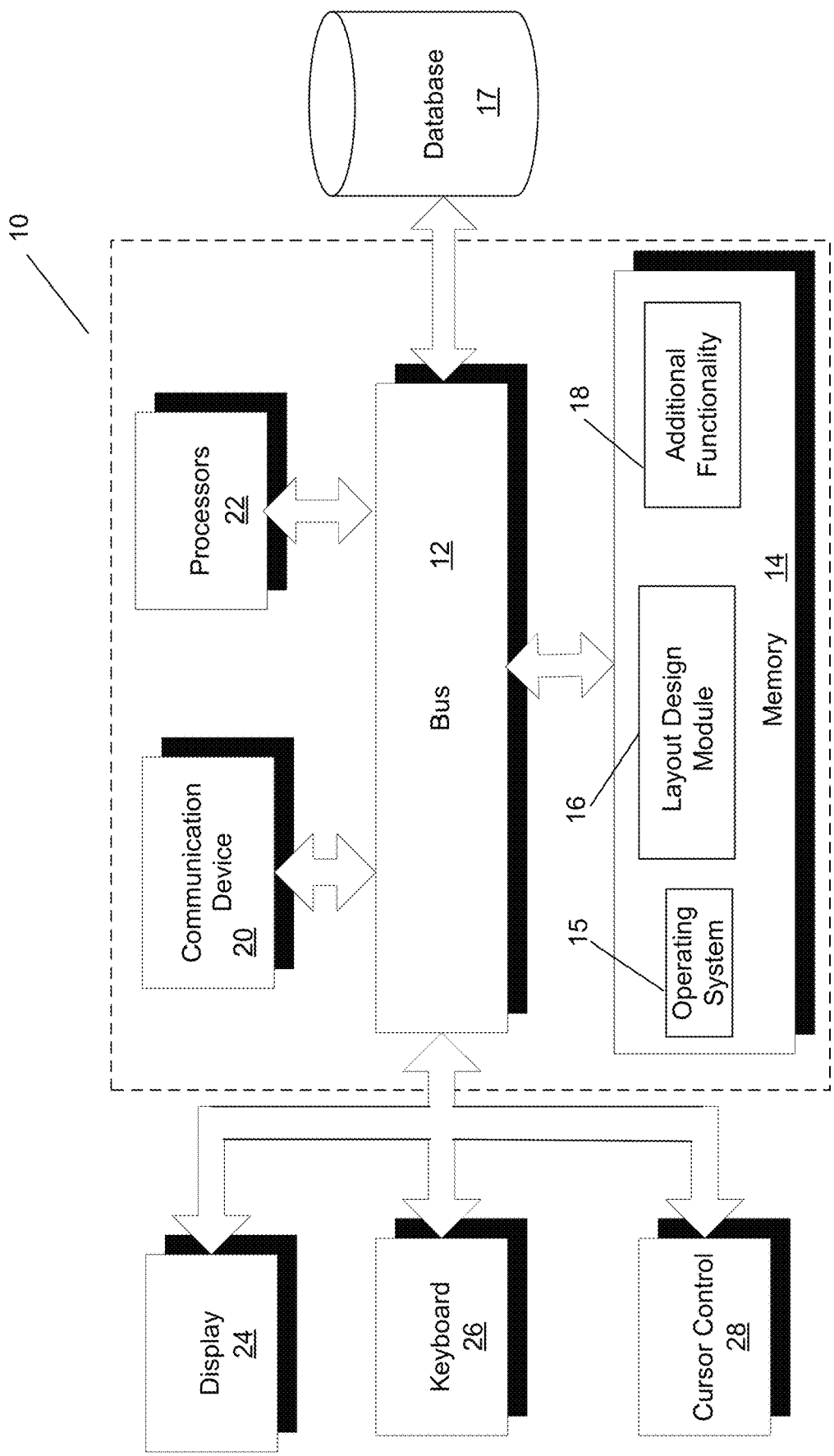
FIG. 1 is a block diagram of a computer server/system in accordance with an embodiment of the present invention.

One embodiment provides a user interface ("UI") layout design system for developing UIs for interactive web applications. One embodiment provides a grid architecture with a set of affordances (i.e., what a user is allowed to do) and constraints (i.e., what a user is not allowed to do) that allow for a non-technical user (e.g., a business analyst, sales consultant, etc.) to develop a responsive UI that conforms to different screen sizes of different machines, while also adhering to good UI design practices. The UI layout design system may be built into a product that is used to develop interactive web applications.

Generally, some known systems have implemented UI layout design functionality in visual design tools (e.g., "Adobe Illustrator" from Adobe Systems Inc.), integrated development environments (e.g., "Visual Studio" from Microsoft Corp.), prototyping tools (e.g., "Axure RP" from Axure Software Solutions Inc., and "Balsamiq Mockups" from Balsamiq Studios LLC), etc. These systems provide a set of affordances, constraints, and tools that allow a user to array "componentry" and "content" on a UI work surface or "canvas." Examples of componentry are buttons, lists, form fields, tables, charts, etc. Examples of content are text blocks, headers, images, and other media.

Some of these known tools are more "free flow," meaning the user can generally place anything anywhere (e.g., with no "snap to grid" functionality), place components on top of one another, etc. Some other known tools are more constrained, meaning they hold the user to predefined drop targets and behaviors, templatize the available options for the user to craft a UI from, etc.

Each of these known systems has respective drawbacks. The unconstrained models result in a lot of ancillary tooling being introduced to allow the user to align, position, space, and distribute objects correctly, as these functions cannot be done easily with a mouse and a keyboard. Therefore, the unconstrained models are complicated and not easy to use. On the other hand, the constrained models are often too constrained and do not give the user the range of motion they need to create compelling UIs.

Further, there has recently been a desire for designing and building UIs "responsively." For a UI to be responsive, it needs to shift, resize, and/or reapportion its space in response to a change in the size of a "viewport." A viewport refers to a polygonal viewing region in computer graphics. The size of a viewport may change due to, for example, resizing a window on a desktop, showing a UI on a different device (e.g., a tablet or mobile phone), etc. Building UIs responsively obviates the need for separately designing a UI for each device or form factor. However, known layout engines typically either completely leave responsive design out, or make some strict assumptions about how users want the UI to "reflow" when resized. For example, some known systems such as "Adobe Dreamweaver" from Adobe Systems Inc., allow a technical user to more accurately define these behaviors programmatically, but this requires acumen that would typically require a professional web developer.

In contrast to the known systems, embodiments use a strictly-defined layout grid and a combination of UI constraints and business logic to provide a layout design system that allows a non-technical user to create compelling, standards-based UIs that are responsive when viewed on screens/devices of various sizes. One embodiment defines a design time and runtime layout design engine for building responsive web applications that automatically adapt to multiple form factors and orientations. The layout design engine manages the screen and determines where a user can drop components. In one embodiment, the layout design engine first defines the positioning of the elements that are dropped onto the layout, and then at runtime, algorithmically determines how those elements are arranged. The layout design system may be used, for example, to design UI layouts for "Oracle Application Builder Cloud Service" from Oracle Corp.

FIG. 1 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. For example, for the functionality of a user client, system 10 may be a smartphone that includes a processor, memory and a display, but may not include one or more of the other components shown in FIG. 1.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, transitory and non-transitory media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a layout design module 16 for providing layout design functionality, and all other functionality disclosed herein. System 10 can be part of a larger system. Therefore, system 10 can include one or more additional functional modules 18 to include the additional functionality. A database 17 is coupled to bus 12 to provide centralized storage for modules 16 and 18 and store user profiles, transactions history, etc.

Generally, UI design and development is an inherently inefficient and error prone process within a product development lifecycle. The process typically starts with a "user experience designer" iterating on low fidelity mockups (which are quick to produce) and then completing a user interaction specification to detail how the UI will function once completed. After the user interaction specification is finalized, a "visual designer" steps in to refine the visual attributes of the UI and provide a redline specification to a "UI engineer." The UI engineer then implements the UI according to the user interaction specification and the redline specification. There are many opportunities for error and misinterpretation along this lifecycle, and if an error is identified late in the lifecycle, it may affect various previous phases of the product development lifecycle.

However, embodiments provide a layout design system that combines the three aforementioned phases into one. In one embodiment, the interaction design is wrapped into the UI components available to the user. That is, the UI components that are made available to the user are configured such that they do not require further interaction design. In one embodiment, each component also has a default set of behaviors when the user clicks them, enters text into them, or otherwise interacts with them, and the user can customize these behaviors if desired. Examples of these behaviors are messaging about expected or invalid input, highlighting or stylistic changes to make the component appear to be visually enabled, etc.

Additionally, the visual design is provided "for free" (e.g., by default). For example, a rule such as "a 10 pixel margin from the left edge" can be coded into each component so that the user does not have to follow a redline specification to enforce the rule. Further, the ambiguities in layout, alignment, row height, background color, etc., are abstracted out (e.g., coded/specified once and then reused). Finally, there is no complex UI engineering as all the front end UI behaviors, the mid-tier data binding, and the backend data transactional layer are automated and made transparent to the user.

Accordingly, the entire UI design and build process can be performed by one person in real time, and changes can be made on the fly without detailed rework. In addition, the layout design engine according to the embodiments results in a "better" UI, since given too much freedom, any of the actors in the product development lifecycle are capable of causing the UI to lack consistency, violate best practices and usability principles, or be functionally unsound.

In one embodiment, the overall layout of the canvas is controlled by a 12 column grid in which each logical row is split into 12 equally wide columns. The embodiment further allows for "containers" to be defined within the grid architecture. A container defines an area on the layout and may include UI components or other containers. A container that includes another container is referred to herein as the "parent container" of the other container. The embodiment further implements certain UI containers referred to herein as "panels," and each panel can include a grid architecture in itself. For example, in one embodiment, when a user places two panels side by side on the canvas, each of the panels occupies 6 columns of the 12 column grid of the canvas, and each panel includes its own 12 column grid architecture. Other embodiments may use grids that include a different number of logical columns.

In one embodiment, each UI component (e.g., textboxes, checkboxes, combo boxes (e.g., a box that includes text as well as other elements such as a check mark), image components, etc.) has a specified minimum width and a specified default width. In one embodiment, a component occupies its specified default width when it is first dropped onto the canvas. The component can then be resized to a width larger than or equal to its specified minimum width. In one embodiment, for each UI component, the minimum width and the default width are expressed in terms of "ems," "logical columns," or both ems and logical columns. "em" is a relative length unit that specifies a length relative to the font size of an element. For example, a width of "2 em" is twice the size of the current font of a UI element. A logical column specifies the width of one column in a grid architecture. For example, in a 12 column grid of equally wide columns, a width of "2 logical columns" is one sixth of the total width of the grid.

In one embodiment, during the design of a UI, a UI component can only be dropped onto a grid row if the default width of the component, in columns, is equal to or less than the "left over" space in that grid row. The left over space is the space that is not yet occupied by UI elements already dropped onto the grid. For example, if an "input textbox with label" has a default width of four columns and a user drags one such textbox onto the left side of a 12 column canvas with four or more unoccupied columns, by default the textbox sizes to occupy the left four columns. If the user then resizes the textbox to occupy 6 columns, the user can then drag another 4 column input textbox into the right of the first textbox. However, the embodiment disallows dragging and dropping a third textbox since there are not enough unoccupied columns left on the canvas to accommodate a minimum width requirement of four columns for another textbox.

In one embodiment, panels cannot be nested within other panels. However, unlike UI components which can only be dragged and dropped onto unoccupied space on the canvas, panels can "steal" space from adjacent panels either vertically or horizontally. For example, if there are two panels side by side on the canvas and a third panel is dragged in between them, the new panel steals a proportional amount of space from the two other panels so that all three panels become the same size. The user can then manually resize each panel.

In one embodiment, the panel and grid architecture in combination enforce responsive behavior for the UI while UI components within each panel remain grouped together. For example, in one embodiment, if there are two panels side by side on the canvas and then the width of the screen is compressed (e.g., due to a device orientation change, resizing of the window, etc.), the panel on the right reflows to "tuck under" the panel on the left. Further, within each panel, the embedded grid rows themselves enforce responsive behavior. For example, in one embodiment, if there are three side by side input textboxes in a panel and then the width of the panel is compressed (e.g., due to a device orientation change, resizing of the window, etc.), the textboxes automatically stack one on top of the other.

In one embodiment, there are no component properties or attributes that the end user needs to set to allow for responsive behavior. Rather, the responsive behavior is hard coded based on Cascading Style Sheet 3 ("CSS3"), and the code executes in a responsive style sheet that sits on top of the UI and defines component positioning. In one embodiment, the grid itself always includes the same number of logical columns at different viewport sizes. For example, a 12 column grid structure always maintains 12 logical columns, but for smaller viewports, the style sheet may dictate that the grid compresses. For example, the grid may compress by having three 4-column spaces arrayed top to bottom instead of side by side.

In one embodiment, a UI component toolkit enforces component attributes such as padding, margins, alignment, spacing, etc., on a component by component basis, and such attributes are enforced consistently among components. For example, in one embodiment, the components of the layout design system are based on Oracle Jumpstart Enterprise Toolkit ("JET") (i.e., the components are JET-based) to ensure consistent behavior. Oracle JET Toolkit is a UI framework including layout tooling, UI components, and a certain amount of front-end business logic. Oracle JET Toolkit is based on "Oracle Alta Design Patterns" which specify the current UI standard for "Oracle Public Cloud" products. Alta Design Patterns inform the look and feel, interaction design, and behavior of the UI of Oracle Products.

By implementing JET-based components that already follow Alta Design Patterns, users of the embodiments need not concern themselves with having an intimate knowledge of JET or Alta. For example, in one embodiment, if multiple input components are dragged and dropped onto a form, the componentry itself knows that the labels, by default, should be right aligned with one another, with the longest label determining the offset from the left margin of the container, and that the labels should be 8 pixels away from the input boxes.

Canvas and Layout Manager

In one embodiment, a "Canvas and Layout Manager" allows for various ways in which a user can interact with the canvas to add UI componentry, affect layout/sizing/alignment, and/or customize the look and feel of the screens they are designing. The canvas is the core of the designer screen. The canvas, in one embodiment, has a width ranging from a minimum of 1024 pixels to a maximum of 1440 pixels. In one embodiment, the canvas height is variable based on the contents placed in it, but upon initial load, it has a default height of a certain number of pixels. Each created screen may have a UI "shell" around it, which may be shown on the canvas by default. The leftover area can then be populated with UI componentry.

The Canvas and Layout Manager controls and manages the position, size, and alignment of UI elements on the screen in the canvas. It provides a set of visual affordances and constraints that allow for flexibility in the UI while at the same time reducing the possibility of creating "ugly" UIs. The base components of the Canvas and Layout Manager include layout rows, layout columns, and panels. A layout row is a container that occupies an amount of horizontal space equal to the width of its parent container (i.e., the outer container that includes the container). Layout rows can include layout columns. A layout column is a container that occupies a section of a layout row. A layout column occupies a variable amount of space depending on which UI components are placed inside of it.

In one embodiment, when a user manually resizes a UI component, the column that includes the component grows or shrinks to accommodate the new size of the component. The unit of measurement for layout columns is "logical columns." A layout column may be implemented as a software object in the page model, such as an "oj-Column" object in a "Document Object Model" of the page. For example, when defining an oj-Column object in a 12 column grid architecture, a developer specifies how wide to make the column on a scale of 1 to 12. For example, if the layout column is defined as 12 logical columns wide, then no other elements can be placed in the layout row that includes the layout column. As a further example, if the current UI componentry in a layout row occupies 8 logical columns, only UI components with default widths of 4 logical columns or less may be dragged into the remaining space in that layout row.

Panel Specification

One embodiment implements panels which are special UI components used for top level page layout. A panel provides a grouping mechanism for a collection of layout rows/columns and the UI components they include. Panels subdivide the available space on the canvas into meaningful subsections. Panels also allow elements that are functionally similar to stay together when a page is responsively resized. There are some business rules specific to panels. Firstly, unlike layout columns, a panel can "steal" space from another panel, causing the other panel to shrink so the new panel can fit within the canvas. In one embodiment, when this stealing occurs, the UI elements already within the existing panels are scaled down accordingly to fit in the resized panels. Another business rule specific to panels is that a panel cannot be dragged into another panel.

One embodiment achieves the business rules for panel manipulation by providing two groups of drop target areas. The first group, which directly abuts an existing panel edge, allows for dropping a new panel only below, above, to the left, or to the right of an existing panel or between two existing panels. The second group, which needs to be some number of pixels away from existing panel edges, allows for dropping a new panel so that it occupies all the vertical (or horizontal) space across all existing panels in the vertical (or horizontal) aspect of the canvas.

A canvas that includes at least one panel provides the drop targets to the left of an existing panel, to the right of an existing panel, above an existing panel, and below an existing panel. Dragging a new panel to the drop targets to the left or right of an existing panel on the canvas adds the new panel in the same row as the existing panel and splits the available space equally between the existing panel and the new panel. When a new panel is dragged above or below a panel in a column of the canvas, the panels existing in that column are not resized if there is enough unoccupied vertical space left in that column for the new panel to fit. Otherwise, the space in that column is vertically split between the existing and new panels, stealing proportionally from the existing panels in the column to make room for the new panel.

A canvas that includes at least two panels further provides the drop target areas between two existing panels. Dragging a new panel between two existing panels in a same row on the canvas steals width from the existing panels in order to make room for the added panel. When a new panel is dragged between two existing panels in a same column of the canvas, the existing panels are not resized if there is enough unoccupied vertical space left in that column for the new panel to fit. Otherwise, the space in that column is vertically split between the existing and new panels, stealing proportionally from the existing panels in the column to make room for the new panel.

There are four additional drop targets that are available conditionally based on whether the canvas already has multiple rows or columns of panels. If it does, these additional four targets are to the left and right of the entire panel set on the canvas as well as above and below the entire panel set on the canvas. Dragging a new panel to the left/right of an entire panel set occupying multiple rows on the canvas creates a new full height panel to the left/right of the existing panel set so that the new panel occupies the same number of rows as the existing panel set. Dragging a new panel above/below an entire panel set occupying multiple columns on the canvas creates a new full width panel above/below the existing panel set so that the new panel occupies the same number of columns as the existing panel set. In one embodiment, a new panel that is dragged above/below the entire panel set on the canvas is by default sized to occupy a certain portion (e.g., 40%) of the available height of the canvas.

Figure 2:
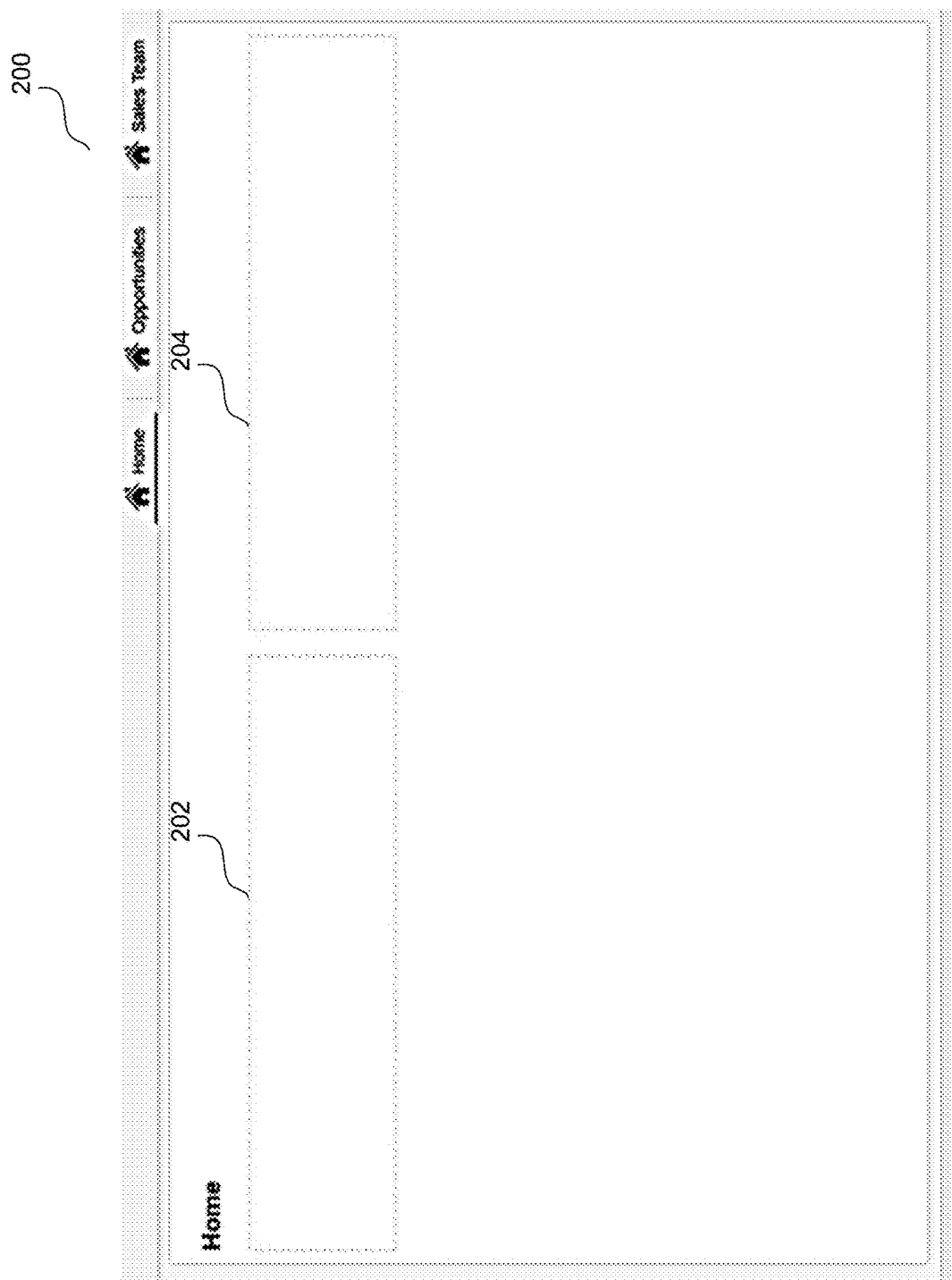
Figure 3:
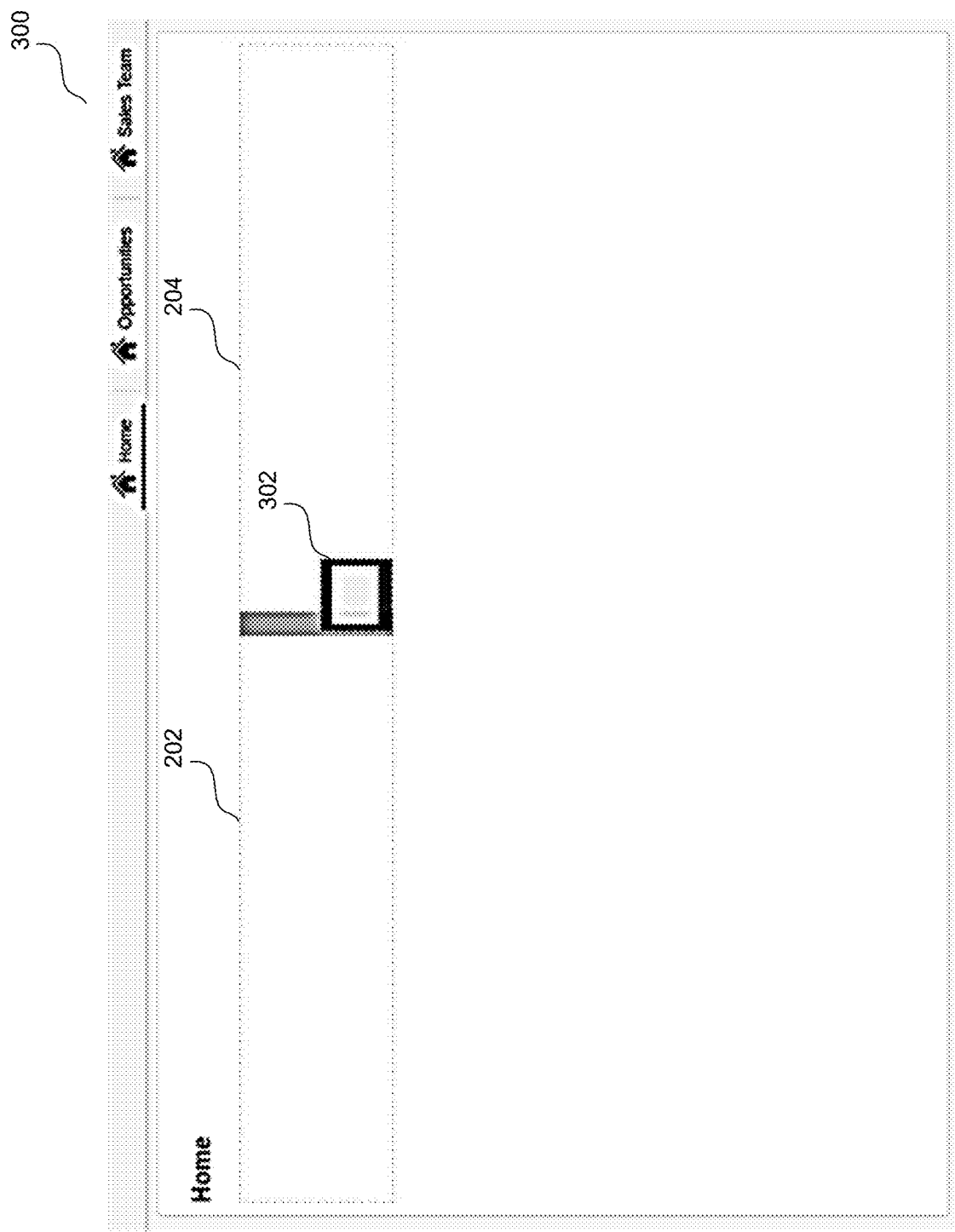
Figure 4:
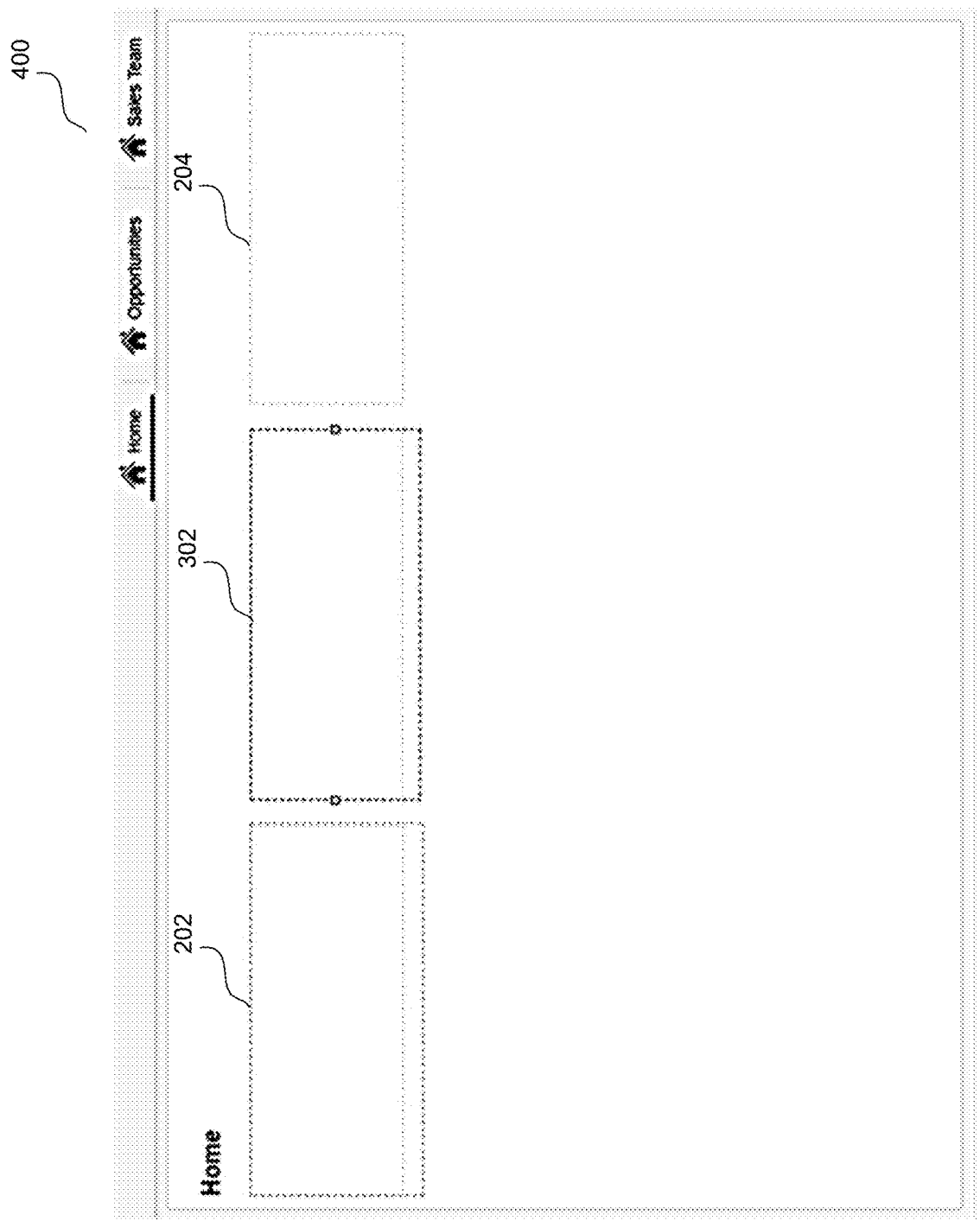

FIGS. 2-4 illustrate a sequence of example screens 200, 300, and 400 as a user adds a third panel in a layout that already has two panels. Screen 200 of FIG. 2 illustrates a layout with a first panel 202 and a second panel 204 in a same row, each occupying half of the available horizontal space on the page. Screen 300 of FIG. 3 illustrates the same layout when a user drags a third panel 302 between first panel 202 and second panel 204. Screen 400 of FIG. 4 illustrates that layout after third panel 302 is dropped between first panel 202 and second panel 204, causing the width of first panel 202 and second panel 204 to be adjusted so that each of the three panels occupies one third of the horizontal space in the layout.

Figure 5:
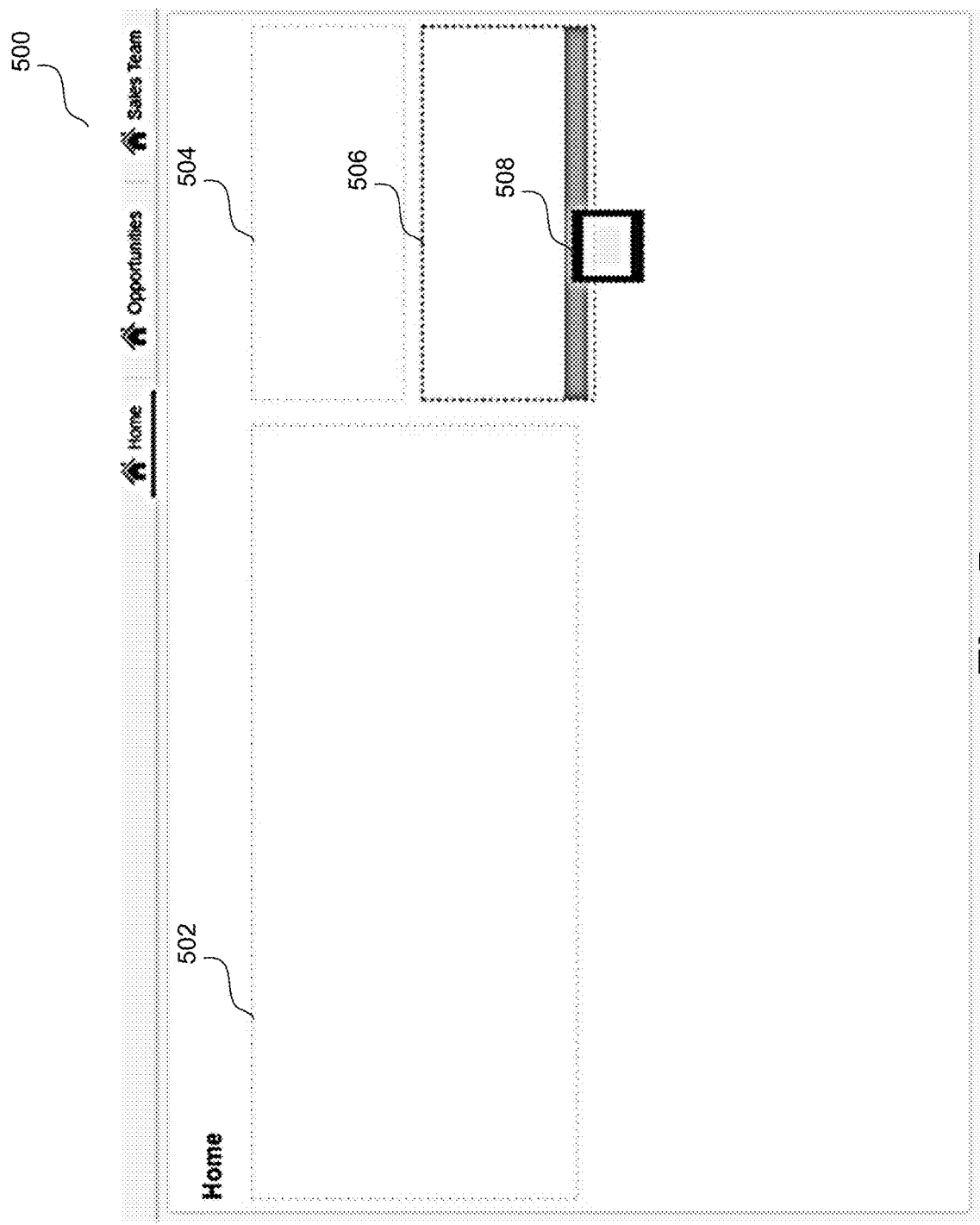
Figure 6:
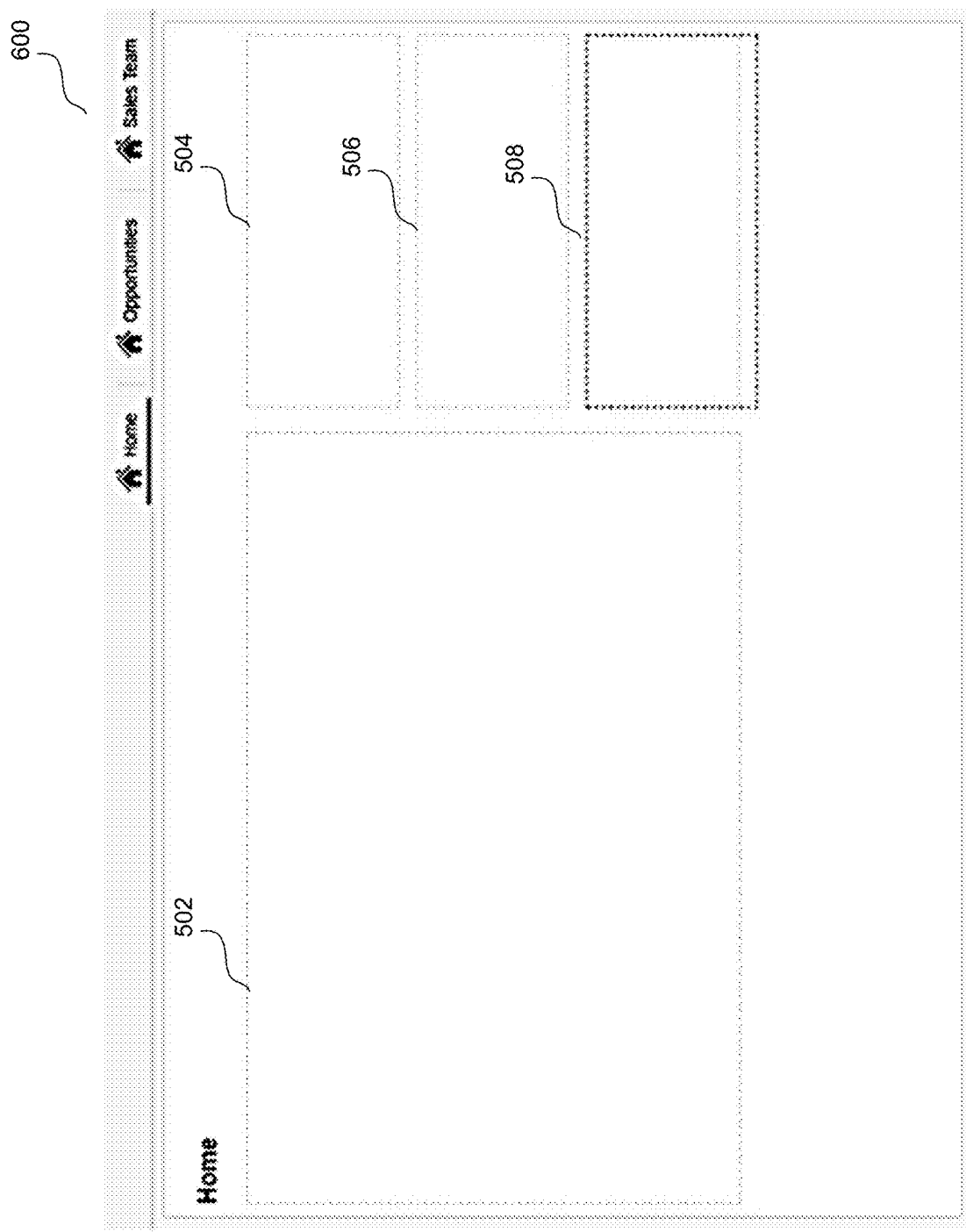

FIGS. 5 and 6 illustrate a sequence of example screens 500 and 600 as a user adds a new panel in a column. Screen 500 of FIG. 5 illustrates a layout with a first panel 502, a second panel 504, and a third panel 506. Second panel 504 and third panel 506 are in the same column and their combination occupies the same vertical space as first panel 502 does by itself. Further, in screen 500, a fourth panel 508 is dragged by a user in the drop target below third panel 506. Screen 600 of FIG. 6 illustrates the same layout after fourth panel 508 is dropped below third panel 506. In the example embodiment of screen 600, there is enough unoccupied space in the column that includes second panel 504 and third panel 506 to fit fourth panel 508. Therefore, second panel 504 and third panel 506 are not resized. However, the vertical size of first panel 502 is adjusted so that first panel 502 occupies the same vertical space as the combination of second panel 504, third panel 506, and fourth panel 508. Accordingly, the total area occupied by the set of panels on the layout is rectangular both before and after the addition of fourth panel 508.

Figure 7:
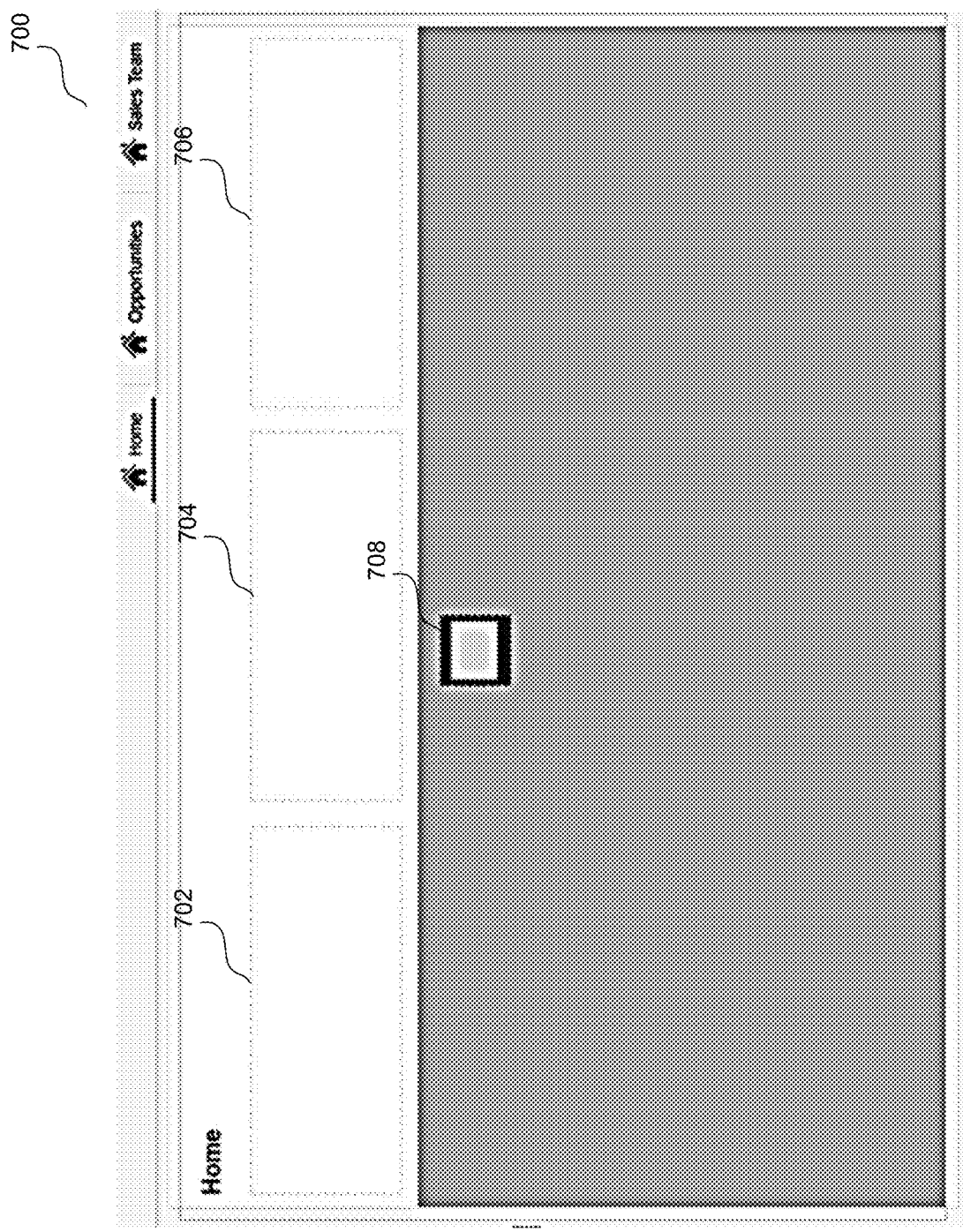
Figure 8:
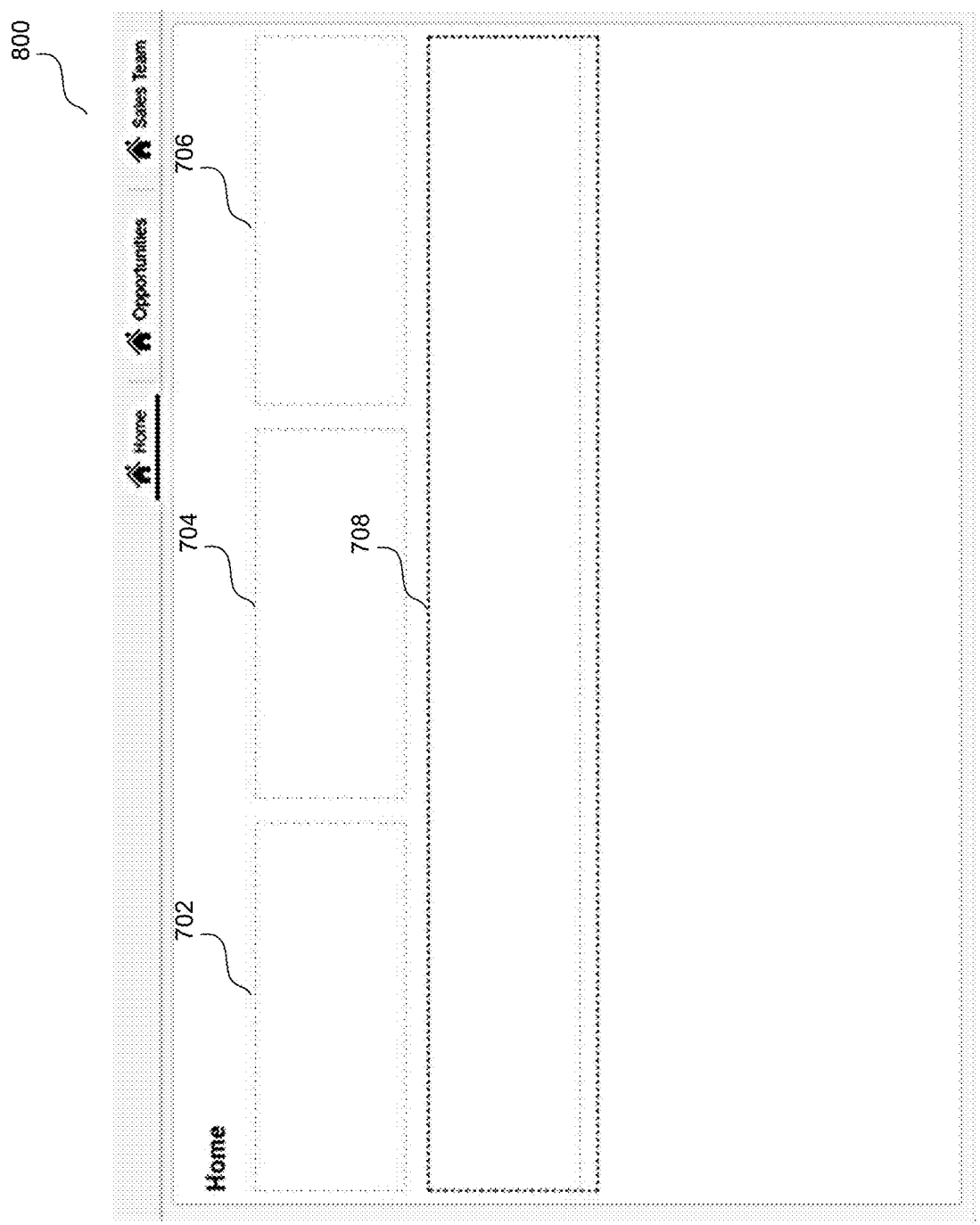

FIGS. 7 and 8 illustrate a sequence of example screens 700 and 800 as a user adds a panel in the drop target area below an entire panel set occupying multiple columns on the canvas. Screen 700 of FIG. 7 illustrates a layout with a panel set including a first panel 702, a second panel 704, and a third panel 706 that are all in the same row of the layout. Further, in screen 700, a fourth panel 708 is dragged by a user in the drop target below the entire panel set on the layout. Screen 800 of FIG. 8 illustrates the same layout after fourth panel 708 is dropped below the entire panel set on the layout, creating a new full width panel below the existing panel set. Accordingly, fourth panel 708 occupies the same number of columns as the combination of first panel 702, second panel 704, and third panel 706. That is, fourth panel 708 occupies all the horizontal space across all panels in the horizontal aspect of the canvas. In the example screen 800 of FIG. 8, all panels on the layout have a same height that is a default height value.

One embodiment provides panel templates that implement multiple panels at once. For example, in one embodiment, a "two column panel template" implements two panels side by side at 50% width apiece, while a "three column panel template" implements three panels evenly sized at 33% width apiece.

In one embodiment, adjustable/configurable panel properties include size and styling options such as background color, margins, alignment, etc. In one embodiment, there is a single style selection option that applies the JET standard panel styles so that a panel has a default background and border color, horizontal and vertical alignment, and top and bottom margins. In an alternative embodiment, the user is able to set these style properties individually. A panel may be resized by grabbing and dragging a side, top, or bottom edge to increase or decrease the width or height.

In one embodiment, adjusting the height (or vertical size) of one panel adjusts the height of each of the other panels in the same row so that all panels in the same row have a same height. In one embodiment, adjusting the width (or horizontal size) of a panel proportionally adjusts the width of each of the other panels in the same row so that all such panels still fit in one row. In one embodiment, adjusting the width of a panel adjusts the width of each of the other panels in the same column so that all panels in the same column have a same width. In one embodiment, the width adjustment of a panel is allowed only if each of the other panels in the same row/column can have a width more than or equal to a minimum width of one logical column, and no panel can be compressed to less than one logical column.

In one embodiment, a panel may be deleted by selecting it and hitting a "Delete" key. When a panel is deleted, the width of each of the other panels in the same row is proportionally adjusted so that the remaining panels occupy the entire width of the row and fill the space made available by deleting that panel.

In one embodiment, property information for each property of a layout component may include description, display treatment, interaction, and default settings. The standard display treatment properties for a panel include a component identifier ("ID") as well as panel specific properties such as background color (which may be chosen from JET constants or via a color picker), alignment (which may be set at the panel level instead of on a component by component basis, with an optional default value of "left"), margins (with an optional default value of "0 em"), vertical alignment (with an optional default value of "top"), and border color (with an optional default value of "none").

Dragging and Dropping UI Components

In one embodiment, UI Components may be dragged from a "Component Palette" onto the canvas. When adding a UI component is being added to the layout, the embodiment also creates required grid containers, columns, and rows to encapsulate the component. The embodiment provides visual affordances that are needed to prevent user errors and give the user a sense of context into what they are accomplishing. For example, when the user is going to drop a component into an empty panel or create a new grid row, a "drop target" affordance appears to give the user a sense of where they are going to be dropping the component.

Further, the embodiment provides a "Space Reservation" widget such that when dropping a component into an already existing row, if there is enough room for the component, the drop target that appears has the same physical size as the default width of the component. This will allow the user to get a sense of the impact of dropping the component at a certain location on the layout. Additionally, if the UI component is too large to be placed in a row over which the user is hovering (e.g., an "invalid" or "not enough space" drop target), a different visual affordance such as an "Invalid Drop target" appears to indicate that the component cannot be dropped there.

In one embodiment, the same Invalid Drop target appears when a UI component cannot be dropped into any other component. One embodiment provides a "Selection" affordance that indicates which UI component is selected in the canvas. In one embodiment, the affordances are further reinforced by both breadcrumbs (a navigation aid used in UIs to allow users to keep track of their locations within programs or documents by providing a trail to follow back to a starting or entry point) and a "Property Inspector" (described later herein). In one embodiment, when the user moves the mouse over one of the side edges of a UI component, a "Resize" affordance appears (where valid) to indicate to the user that they can resize the object.

Figure 9:
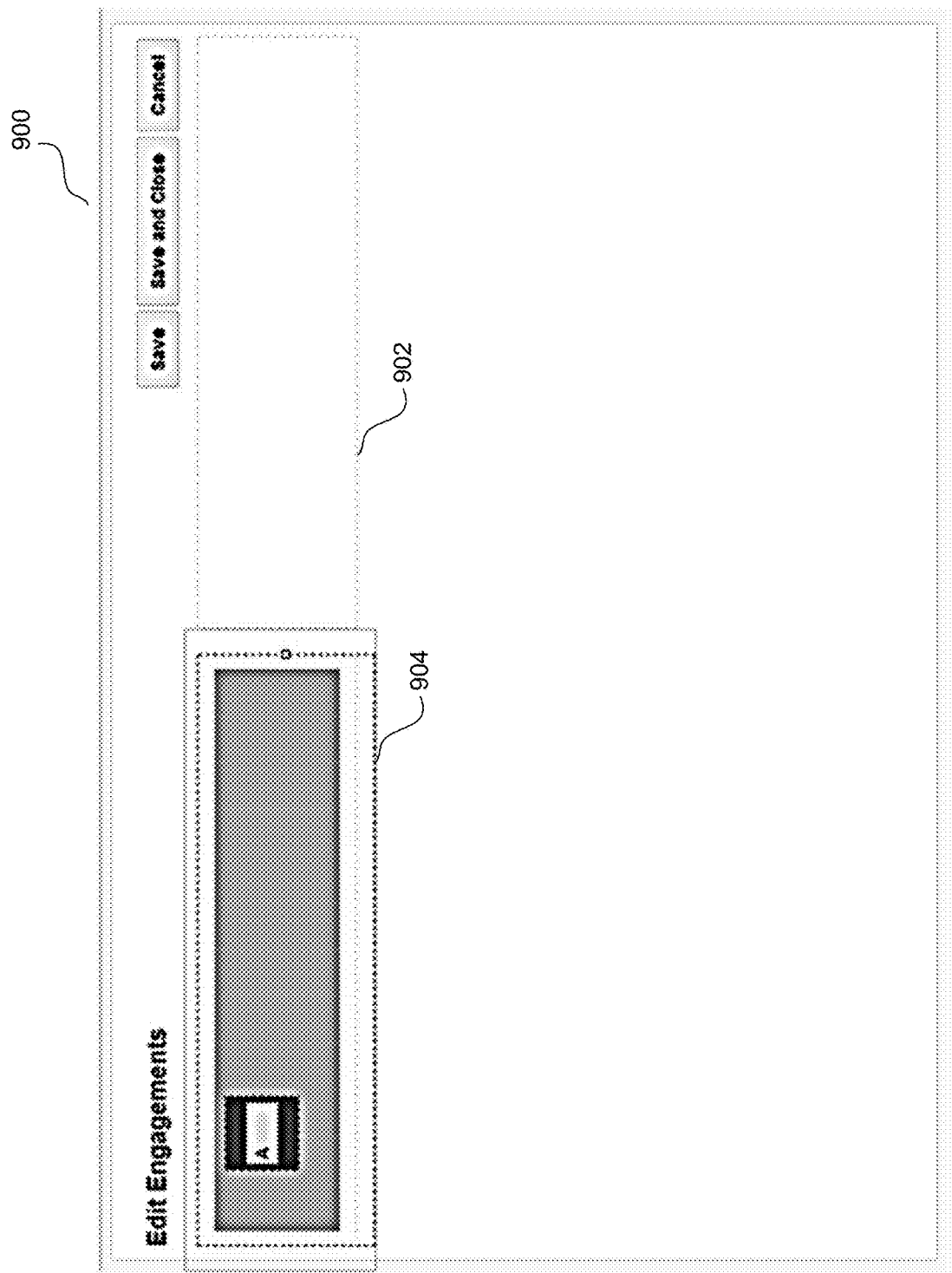
Figure 10:
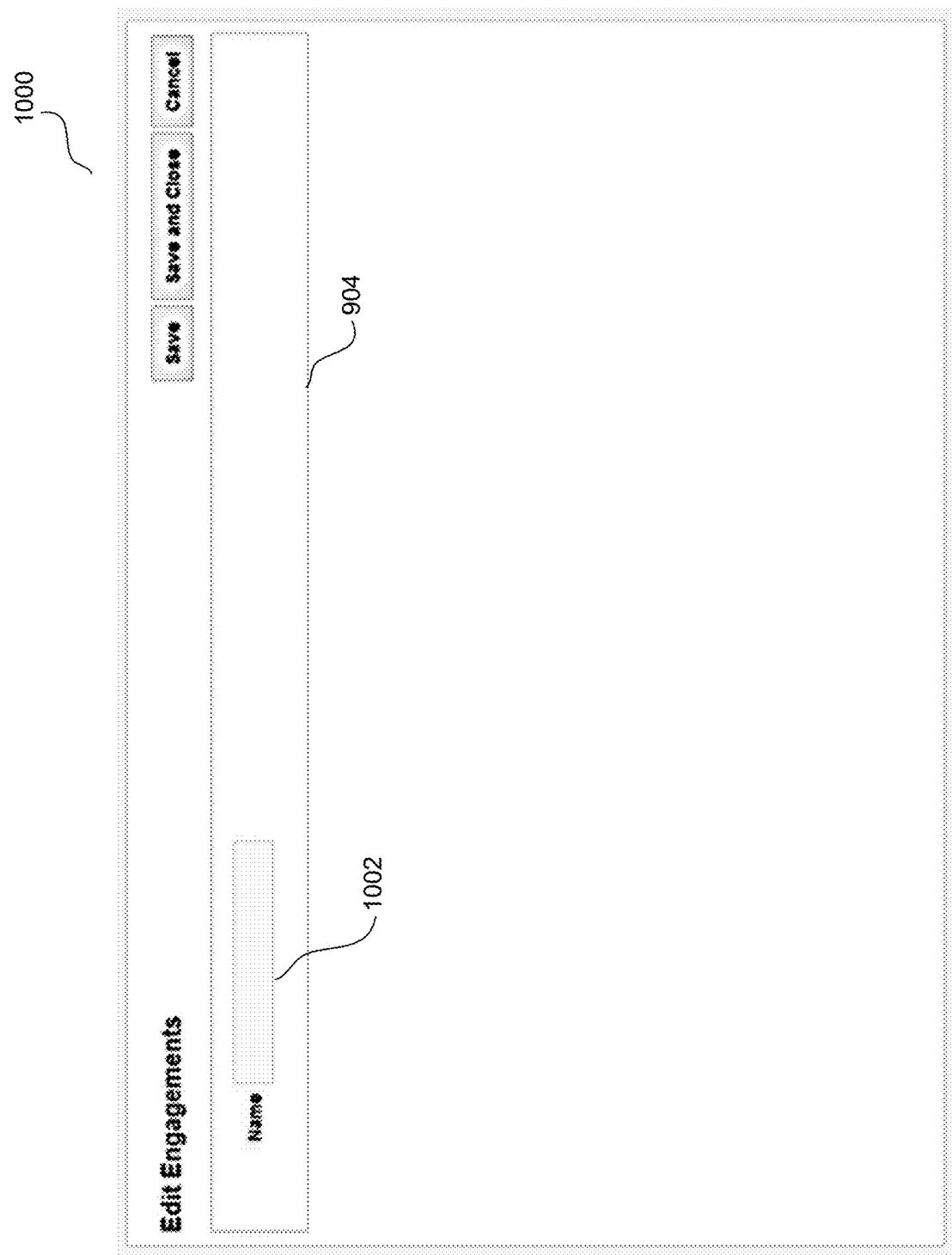
Figure 11:
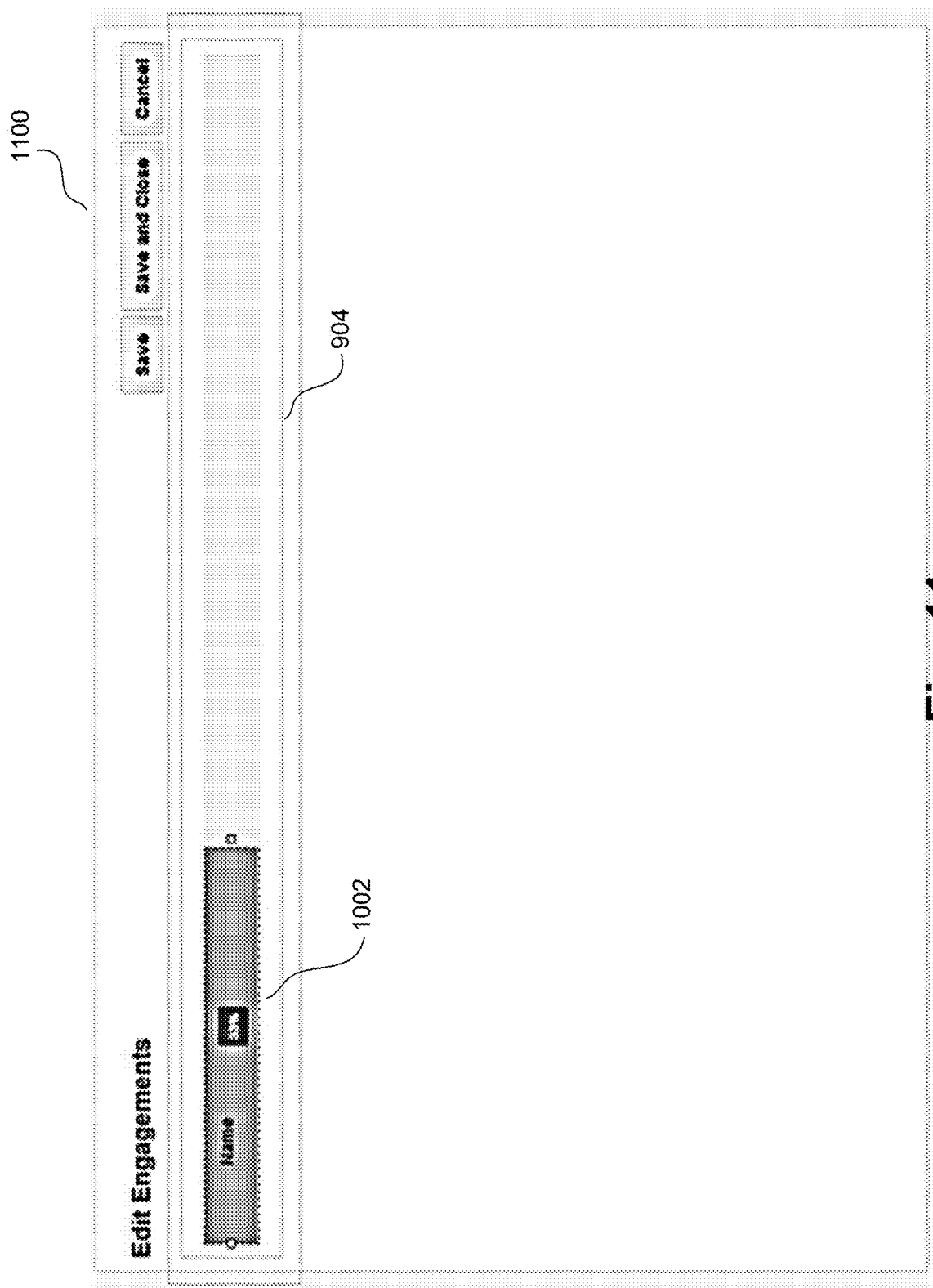

In one embodiment, when the user drags a component to a blank canvas or an empty panel, the embodiment assumes that the user is going to place the object at the top left of the target container. FIGS. 9-11 illustrate example screens 900, 1000, and 1100 where a user adds a UI component to an empty panel. In screen 900 of FIG. 9, an object is dragged to an empty panel 902. If the user drags the object to the top left of panel 902, a Space Reservation widget 904 appears to indicate how the object will be sized, along with the "leftover space" to the right of it. If the user does not specifically drop the object at the top left in empty panel 902, the object is placed there by default and with its default width. Once the drop is complete and the object has been placed within panel 902, any grid or layout indications are turned off, as illustrated in screen 1000 of FIG. 10 where the just dropped object is an input text component 1002. In one embodiment, once a first component has been dropped into an empty panel, any inline user assistances provided for the empty panel (e.g., "Drag Components Here") are turned off. In screen 1100 of FIG. 11, input text component 1002 is selected after being dropped within panel 902. Selecting input text component 1002 causes visual resizing affordances to appear on screen 1100. Further details of such visual affordances are described herein with reference to FIGS. 17-19.

When a user drags a UI component to an empty panel, corresponding "oj-Row" and "oj-Column" objects are created in the page model. The "oj-Row" object has a width equal to the width of the container (i.e., the panel). The "oj-Column" object has the default logical column width of the component being dragged. Accordingly, the newly created row has "leftover space" equal to the number of logical columns not occupied by the just dragged UI component. When a subsequent UI component is dragged onto the canvas, there are three possible drop targets within the panel: to the right of the component just dropped, to a new row above it (which pushes the other row down), or to a new row below it.

Figure 12:
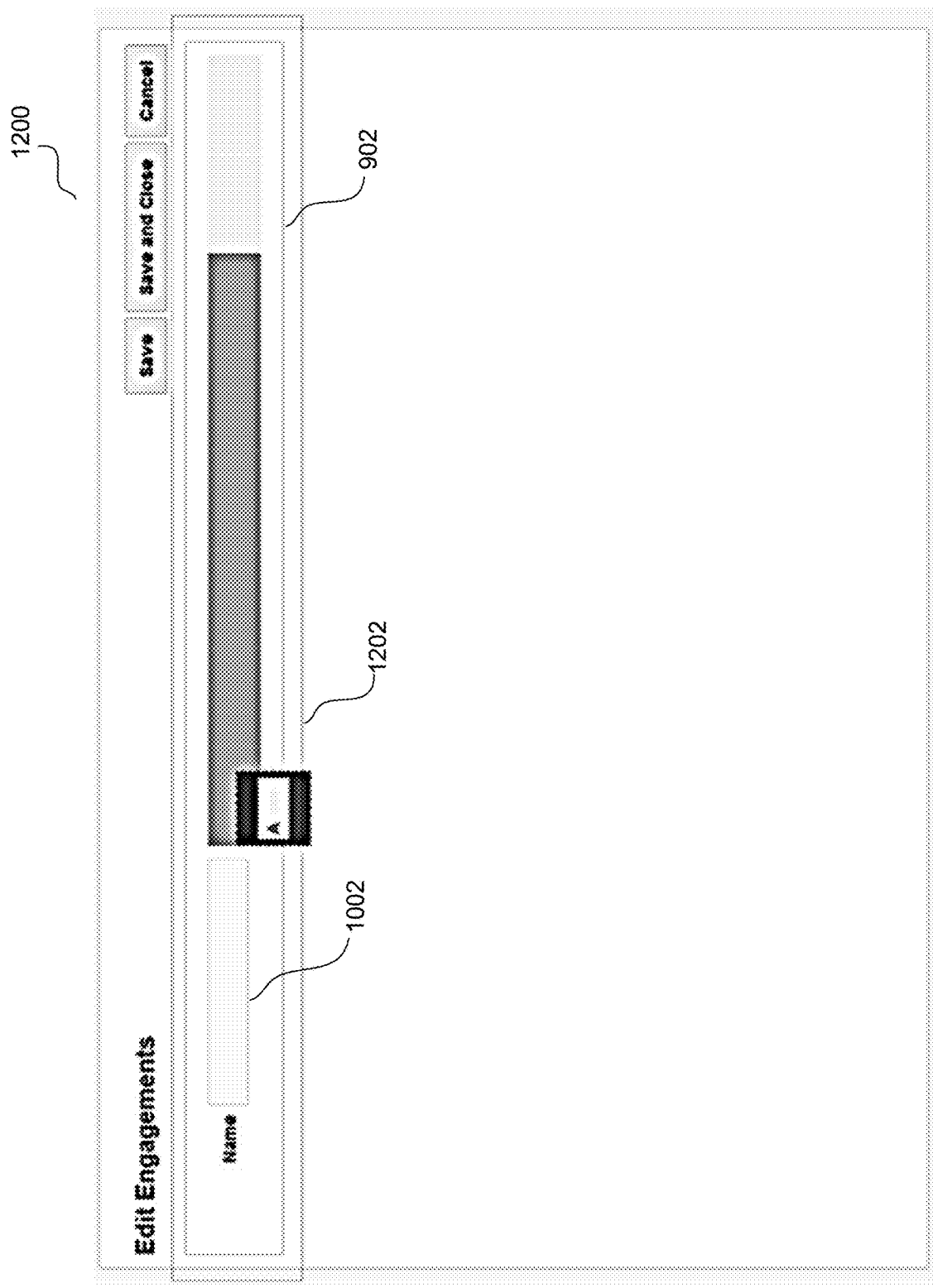
Figure 13:
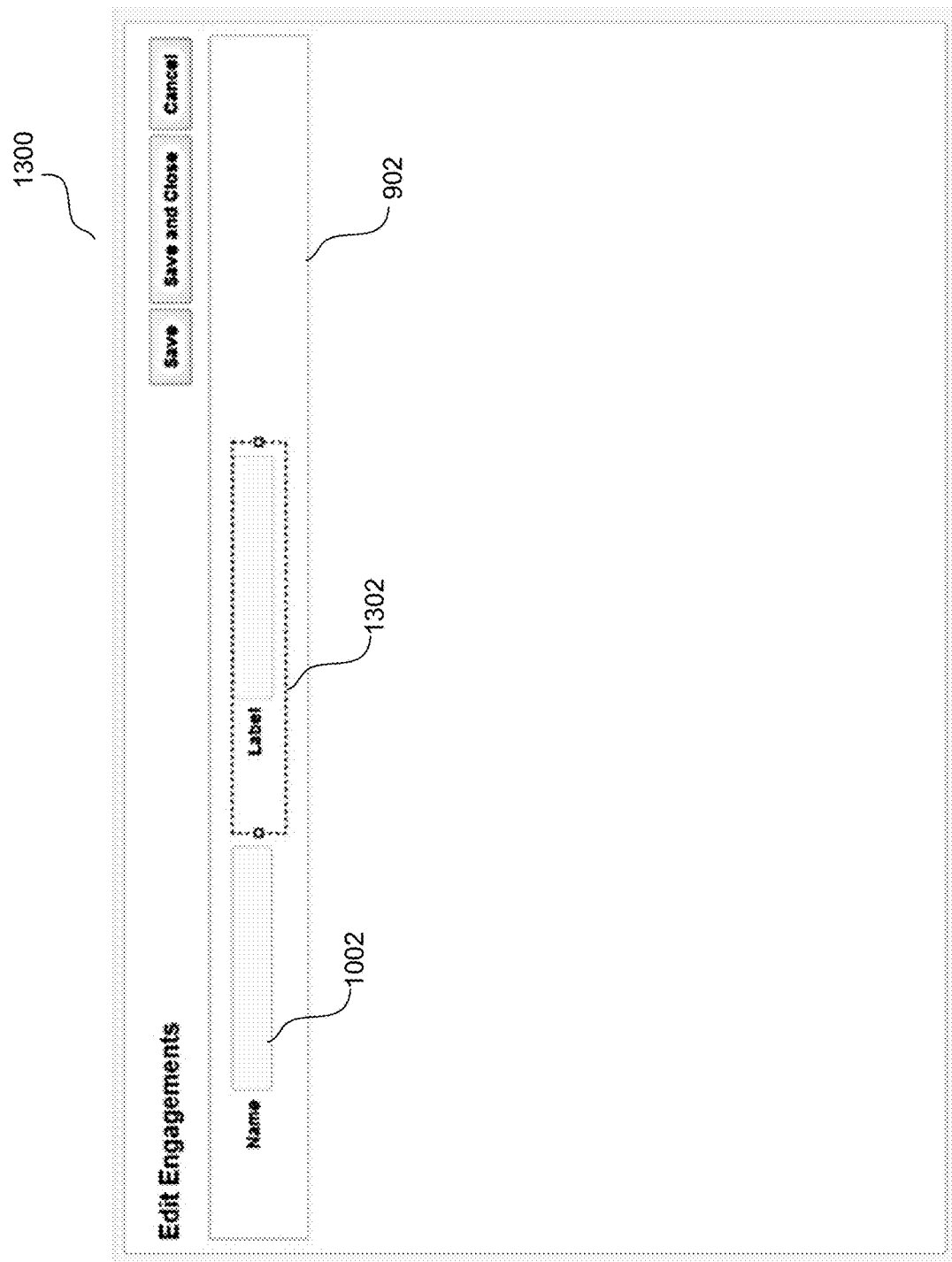
Figure 14:
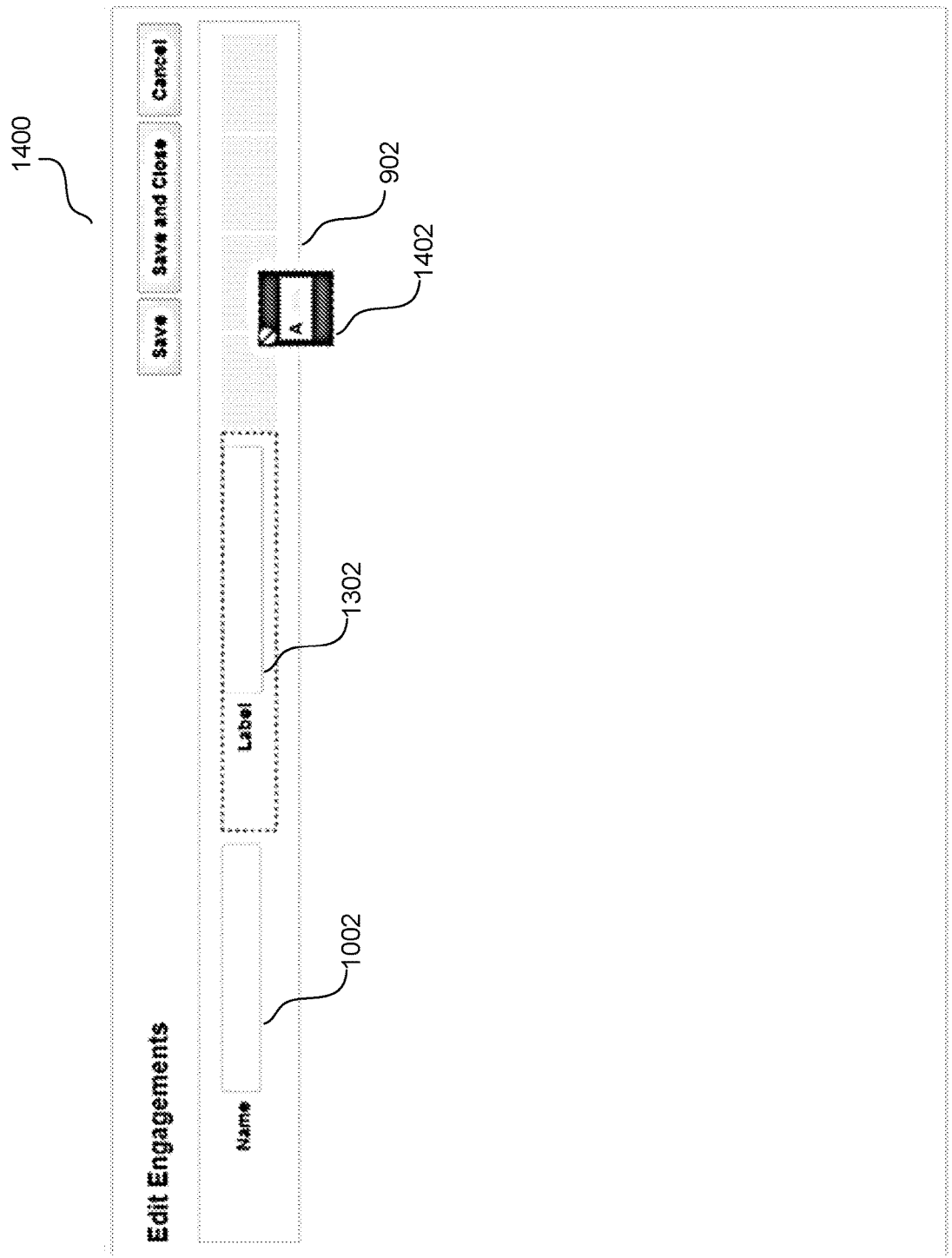

FIGS. 12, 13, and 14 illustrate a sequence of example screens 1200, 1300, and 1400 as a user drags subsequent UI components to the right of input text component 1002. In screen 1200 of FIG. 12, since there is enough room for another input text component in the existing row of input text component 1002, the user gets a "Space Reservation" widget 1202, showing them what will happen if they drop the second object there. Screen 1300 of FIG. 13 illustrates the result of dropping a second input text component 1302 to the right of input text component 1002. If the user then tries to drag another input text component to that row, which in this example would not fit, an "Invalid/Not Enough Space" treatment 1402 appears as illustrated in screen 1400 of FIG. 14.

Figure 15:
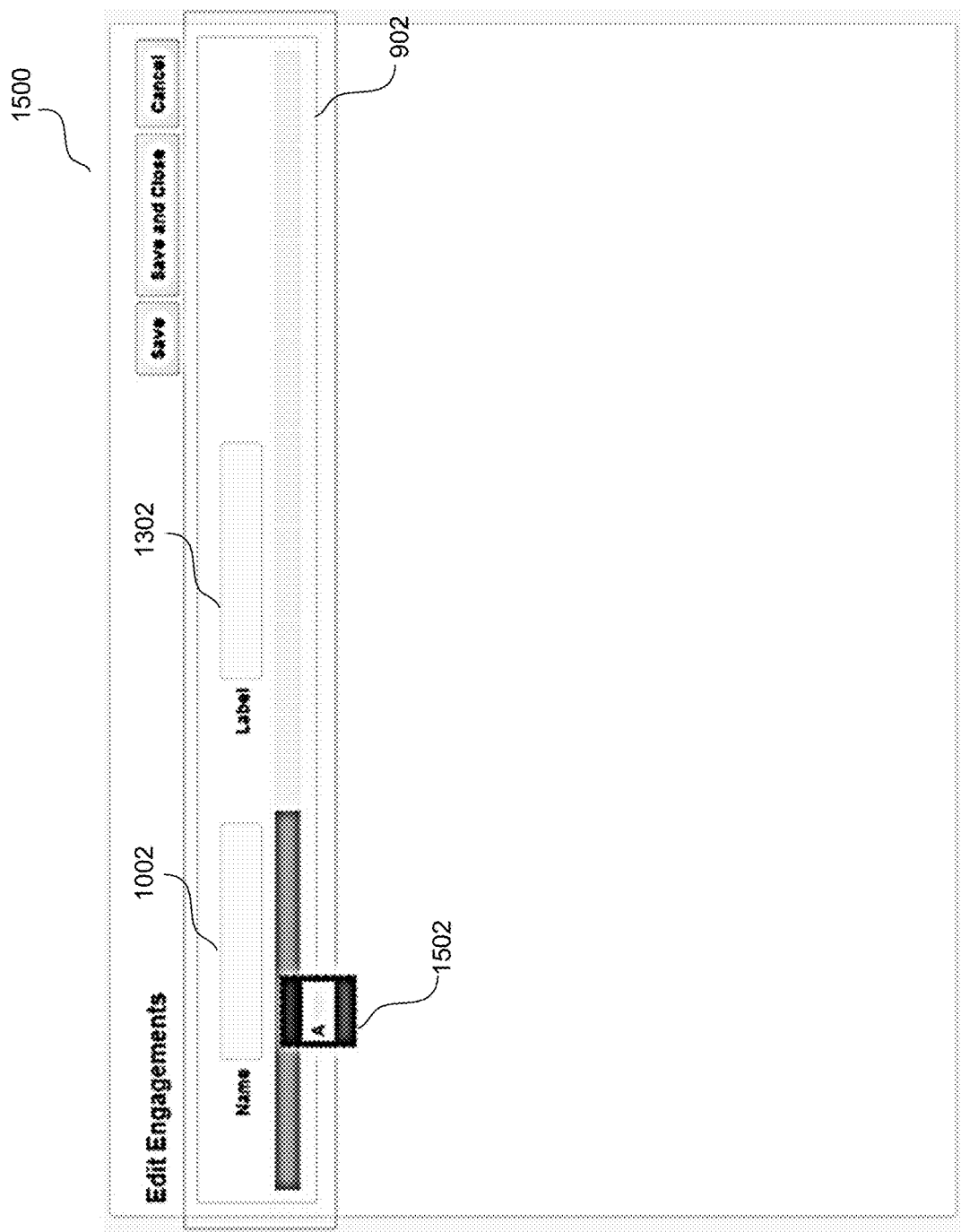
Figure 16:
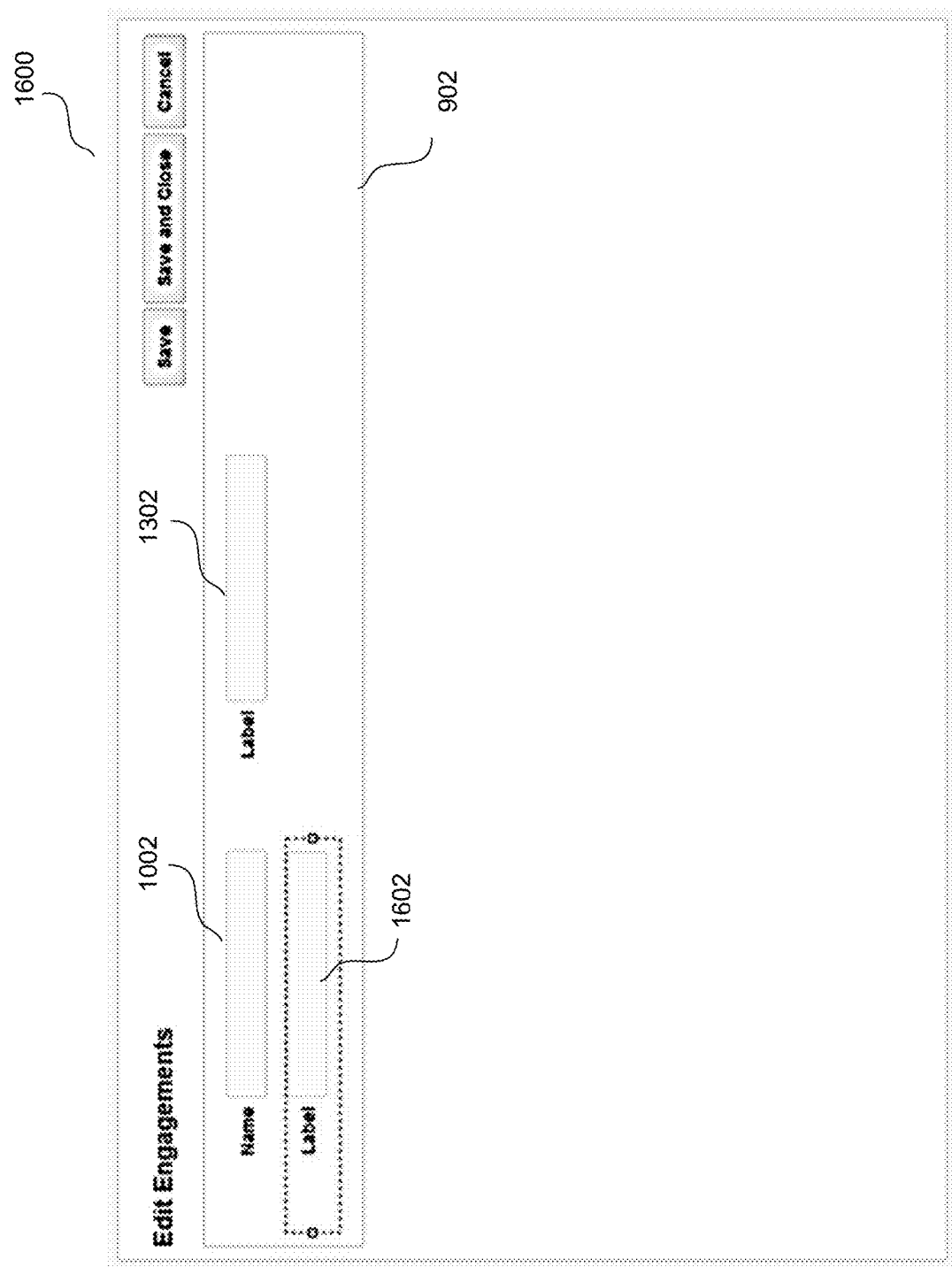

In order to start building down the page, the user may drop a UI component into a new row in panel 902. FIGS. 15 and 16 illustrate a sequence of example screens 1500 and 1600 as a user drags a component to a new row in panel 902. In screen 1500 of FIG. 15, the user drags a new component and acquires a drop target underneath the last row in panel 902, causing a Space Reservation widget 1502 to appear, thereby indicating that it is going to create a new row and put the UI component in it. Screen 1600 of FIG. 16 illustrates the result of dropping a third input text component 1602 below input text component 1002.

Figure 17:
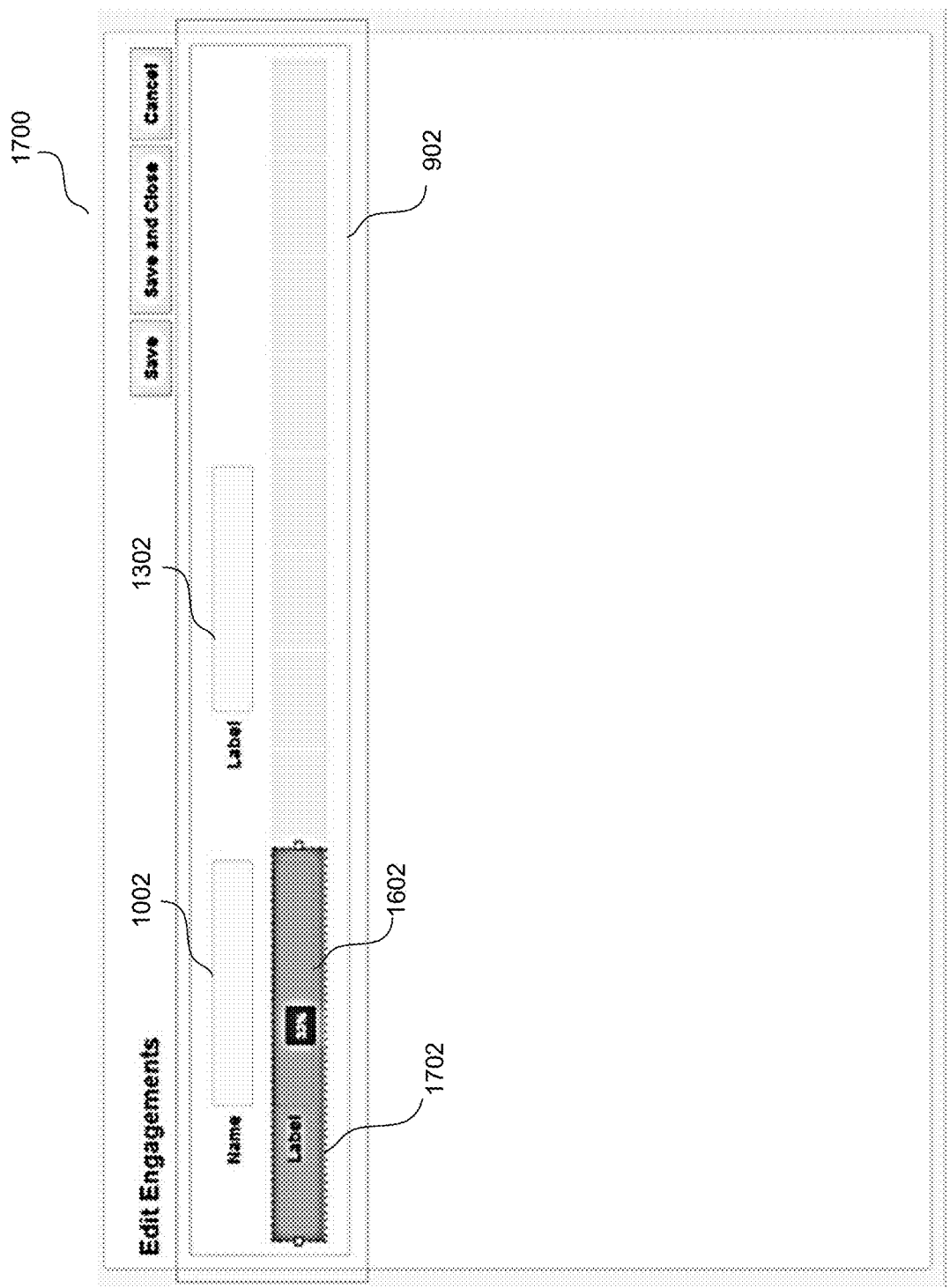
Figure 18:
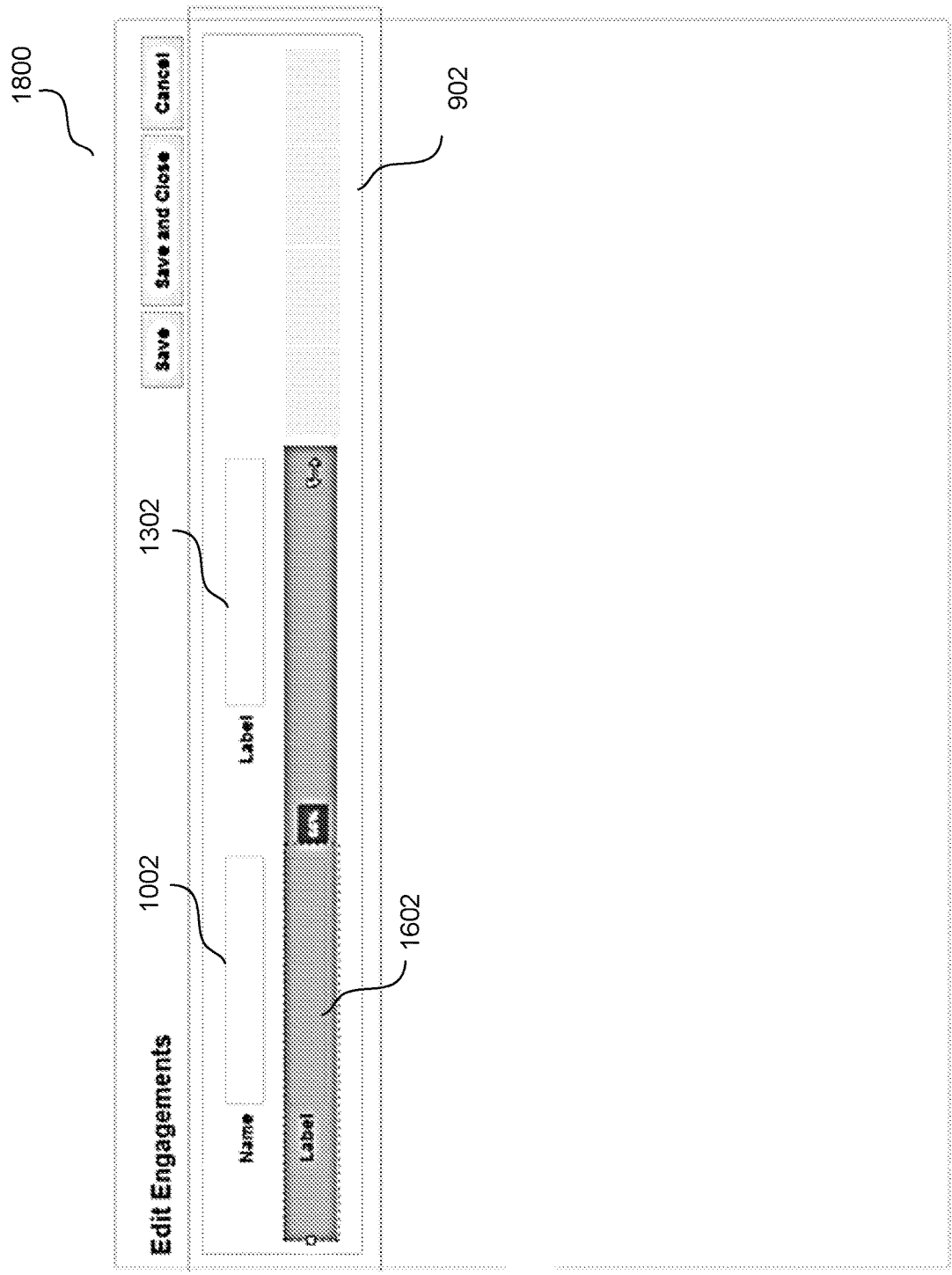

FIGS. 17-19 illustrate a sequence of example screens 1700, 1800, and 1900 as a user resizes a UI component on the canvas. In order to resize third input text box 1602, the user first clicks to select it. As illustrated in screen 1700 of FIG. 17, a selection affordance 1702 appears when third input text box 1602 is selected. Further, the object is indicated in the breadcrumb, and the property inspector updates. The user can then mouse over either the right or left side of their selection, at which point sizing widgets appear on the margins. For resizing left, there need to be empty columns in the current row to the left of the component's current position. For resizing right, there needs to be empty columns in the current row to the right of the component's current position. The resizing affordances only appear if an applicable one of these rules evaluates to "true."

In one embodiment, as the user drag-resizes (resizes by dragging a sizing widget), a visual indication of the percentage of the row is shown. In one embodiment, for horizontal resizing in a 12 column grid, there are various "stop points" identified as 15%, 25%, 33%, 50%, 66%, 75%, 85%, and 100%. These roughly map to 2, 3, 4, 6, 8, 10, and 12 logical columns in a 12 column grid. In one embodiment, the user can only drop to these stop points and not to some random interval. They also cannot resize to smaller than the minimum width for a UI component that is being resized, where applicable. Screen 1800 of FIG. 18 illustrates that third input text box 1602 has been drag-resized to 66%. For vertical resizing (for components which support this), the height is measured in rows, and there is a visual indication of the current number of logical rows that the component occupies as the resizing occurs. In screen 1900 of FIG. 19, when the user finishes the drop and the control is re-rendered, the selection stays on the same component that was just resized (i.e., third input text box 1602).

In one embodiment, UI components can be picked up and moved to other areas of the canvas, and the same rules for dragging-dropping apply as if they were being dragged anew from the Component Palette. When a UI component is moved out of a pre-existing row, the previous space occupied by the UI component is given over to "leftover space." If there are components to the right of the moved component, they do not tuck back to the left, but rather stay in their existing place.

In one embodiment, in order to delete a UI component, the user may select it and hit a Delete key. When they do so, the previous space occupied by the UI component is given over to "leftover space." If there are other components still in the row from which the component was deleted, they stay where they are. When a user deletes the last component in a row, that row is automatically deleted, and contents/other rows below it shift up.

One embodiment provides functionality for selection of multiple elements to allow for groups of elements to be resized, moved, deleted, or copy/pasted together. One embodiment provides copy and paste functionality for elements. One embodiment provides undo/redo functionality for canvas manipulations.

One embodiment uses "Foundation.js" in the JET grid layout system. Foundation is an open-source responsive UI framework based on HyperText Markup Language 5 ("HTM5L") and CSS, specifically Syntactically Awesome Stylesheets ("Sass") and Sassy CSS ("SCSS").

Accordingly, one embodiment provides layout functionality where UI components have a minimum column width that they must occupy, and if there are not enough columns in a target grid row, dropping the component will be disallowed and the component cannot steal space from other components (see, e.g., FIG. 14). Further, by just identifying a position on the canvas, a new panel can "steal" space from its nearby columns, both horizontally and vertically (see, e.g., FIGS. 3 and 4). Accordingly, the embodiment allows a user to achieve a relatively complex layout that still aligns correctly without much user intervention. The embodiment further allows the user to easily group related UI components together (e.g., by placing them in a panel) so that they will reflow responsively when the viewport size changes.

Property Inspector

One embodiment provides a "Property Inspector" that is a modeless editor for components, meaning it appears within the designer UI when a component is selected and each change made in it is applied automatically and updates the component without any need for Save/Cancel buttons. In one embodiment, the property inspector is always open by default, and includes an open/close toggle button above it which is selected by default. The property inspector synchronizes with the current selection in the canvas and remains open unless the user explicitly toggles it closed, in which case it remains closed until the user explicitly toggles it open. The property inspector includes standard elements such as a header indicating the currently selected component (to provide context), as well as properties (included by default), data, actions tabs, and a delete button. The actions tab may be omitted for non-triggerable components such as text fields where a user cannot provide a trigger (e.g., pressing a button, clicking a link, selecting something from a dropdown, etc.) and hence the embodiment does not need to support any actions for that component. A component may also be deleted in the canvas by selecting the component and pressing the "Delete" key on a keyboard. Table 1 shows example properties that apply to various components as appropriate.

TABLE 1

Example properties that may apply to various components as appropriate

| Name | Description | Required | Default Value | PI Component Placeholder Text | Comments |
|---|---|---|---|---|---|
| Label | Text identifier for fields and buttons. | Yes | | | |
| Label Position | Whether the label displays to the left of the component, above the component, or not at all. | Yes | Left, or last setting in current page | | |
| Placeholder | Text to display by default as an aid in field-type components. | No | | Placeholder text | |
| Business Object | Business object providing the value source, if applicable. May be read-only for some components. | No | | | |

TABLE 1-continued

Example properties that may apply to various components as appropriate

| Name | Description | Required | Default Value | PI Component Placeholder Text | Comments |
|---|---|---|---|---|---|
| Business Object Field | Business object field providing the value source, if applicable. | | | | |
| Field Data Type | Business object field data type, if applicable. | | | | |
| Required | Whether the component is required by default. | | | | Note that JET should add the required asterisk to the associated label (if displayed). |
| Read-only | Whether the component is read-only by default. | | | | |
| Disabled | Whether the component is disabled by default. | | | | |
| Title | Descriptive tip that displays on hover for a command control, and when a field has input locus, Often used to inform the user about expected format or other business rules that impact data entry. Applies to field components that accept input locus. | No | None | For fields: Displays in a popup when the user's cursor is in the field. For buttons; Displays in a tooltip. | |
| Add Component Help | Whether to add one or both of the stardard JET field-level help options. | No | None | | |
| Help Short Definition | Option to render a dotted line under a field's associated label indicating help content is available. On hover, the definition displays as a tooltip. Can be used in combination with the source option. Applies to field components with a visible label. | No | None | Brief definition displays when hovering on field label. | |
| Help Target | Option to render a Help icon with the component label. On click, it opens the content source in a new browser tab. Can be used in combination with the definition, and if both are present, the definition also displays as the Help icon tooltip. Applies to field components with a visible label. | No | None | Content to open in new window when user clicks Help icon. | |
| Component ID | Unique component id within the page. Appiles to all components. | Yes | <componentType>n Examples: textField5, button, createButton | | If we add the component in a particular context (e.g. a Create button for a table), we should give it a meaningful ID. The first instance of any component type has no counter; this is added for the second occurrence +. |

FIGS. 20-24 illustrate example screens 2000, 2100, 2200, 2300, and 2400 of an embodiment of a property inspector when a Text Field is selected on the canvas. The property inspector in screen 2000 of FIG. 20 includes three tabs: properties, data, and actions. In screen 2000, the properties tab is selected (which may be the default starting tab of the property inspector). In this tab, a Text Field may be configured to have a label (with options for the label position), a title, and a component ID indicating the component type. In one embodiment, the options for the component to be "Required, Disabled, Real Only" may be moved to a "Data Tab."

A Text Field may also be configured in this tab to provide component help and have a "placeholder." A placeholder refers to textual content that appears within a text component by default and alludes to the required input. For example, a text field with the label "Application Name:" may be configured to have a placeholder value of "My Application ABC."

Figure 21:
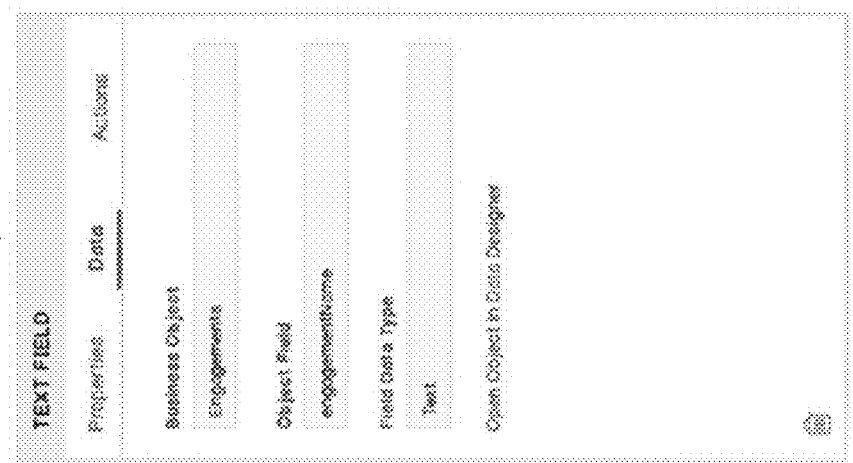
Figure 20:
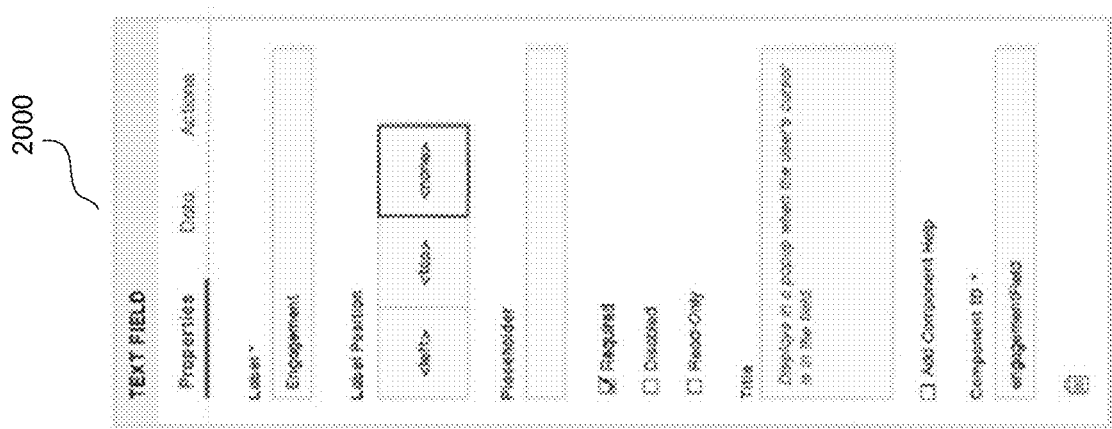

The result of selecting the data tab is illustrated in screen 2100 of FIG. 21. The data tab includes data-related properties including read-only values. In this tab, an "Open Object in Data Designer" link may be used to navigate to a data designer and view and edit the field associated with the component in question. The initial (e.g., default) value of a property may be set exclusively in the data designer.

The actions tab is where the available actions (e.g., navigation, custom scripting, invocation of some operation upon the data, etc.) are configured and managed.

Figure 22:
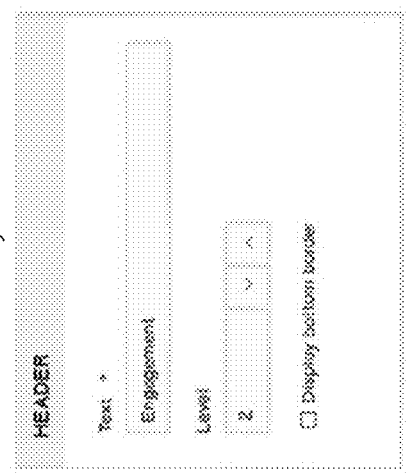
Figure 23:
Figure 24:
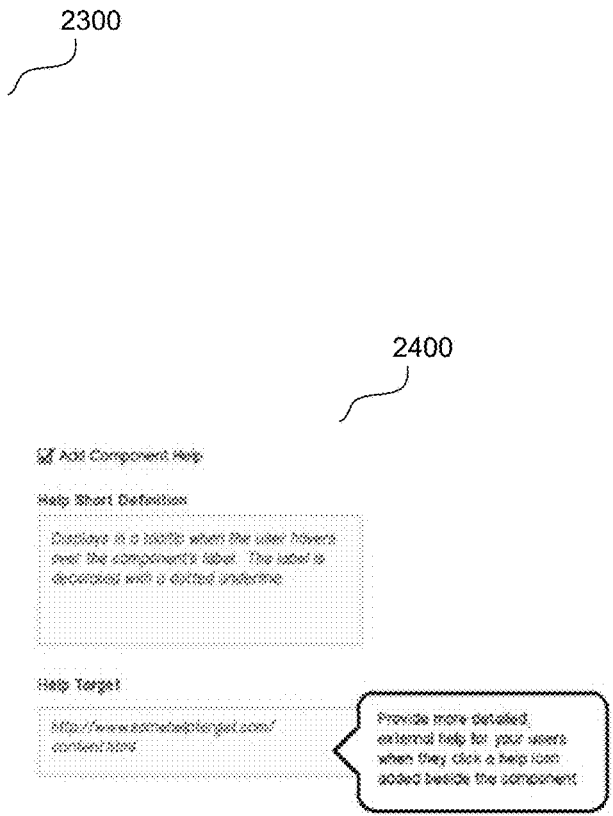
Figure 25:
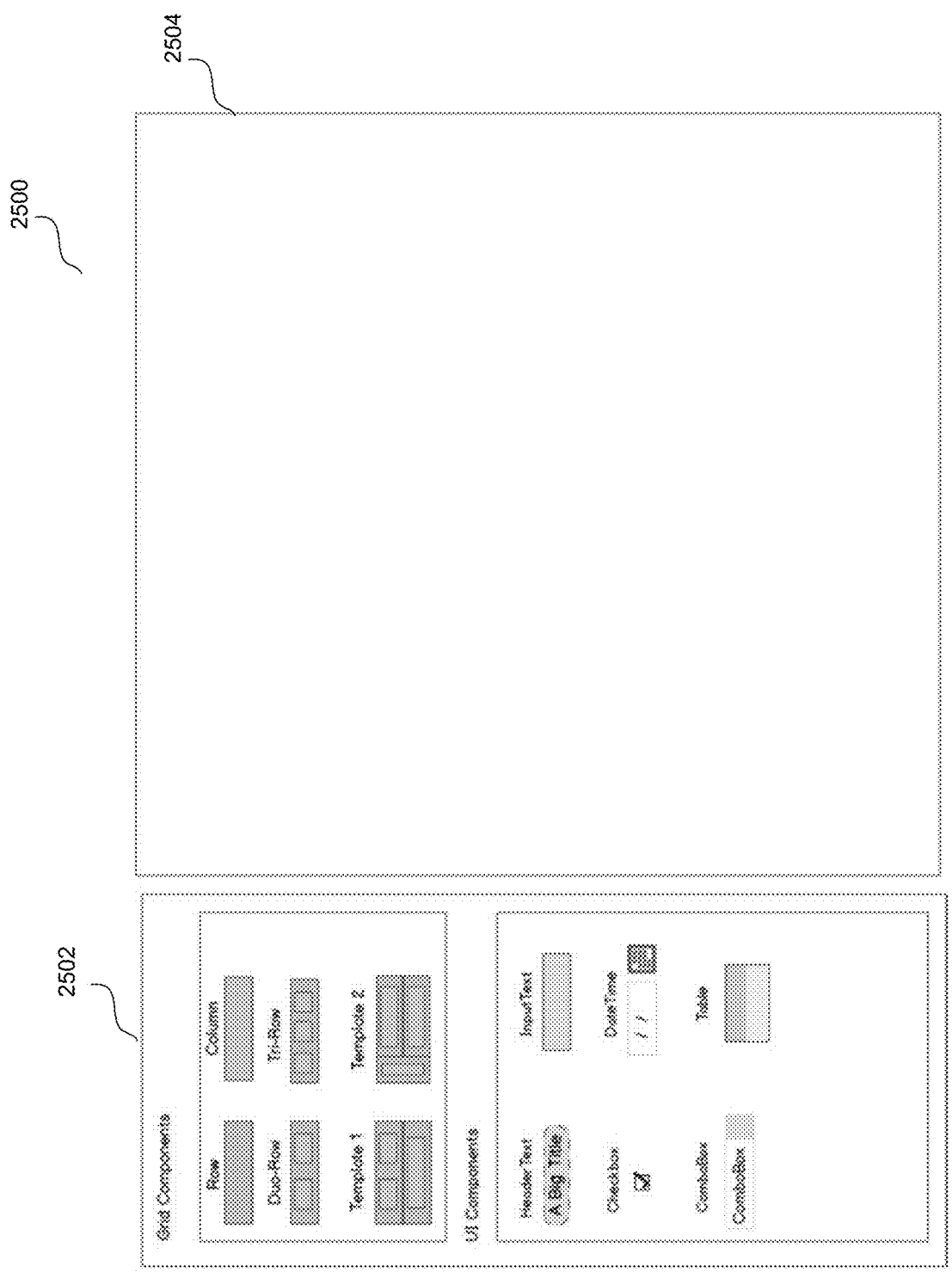
Figure 26:
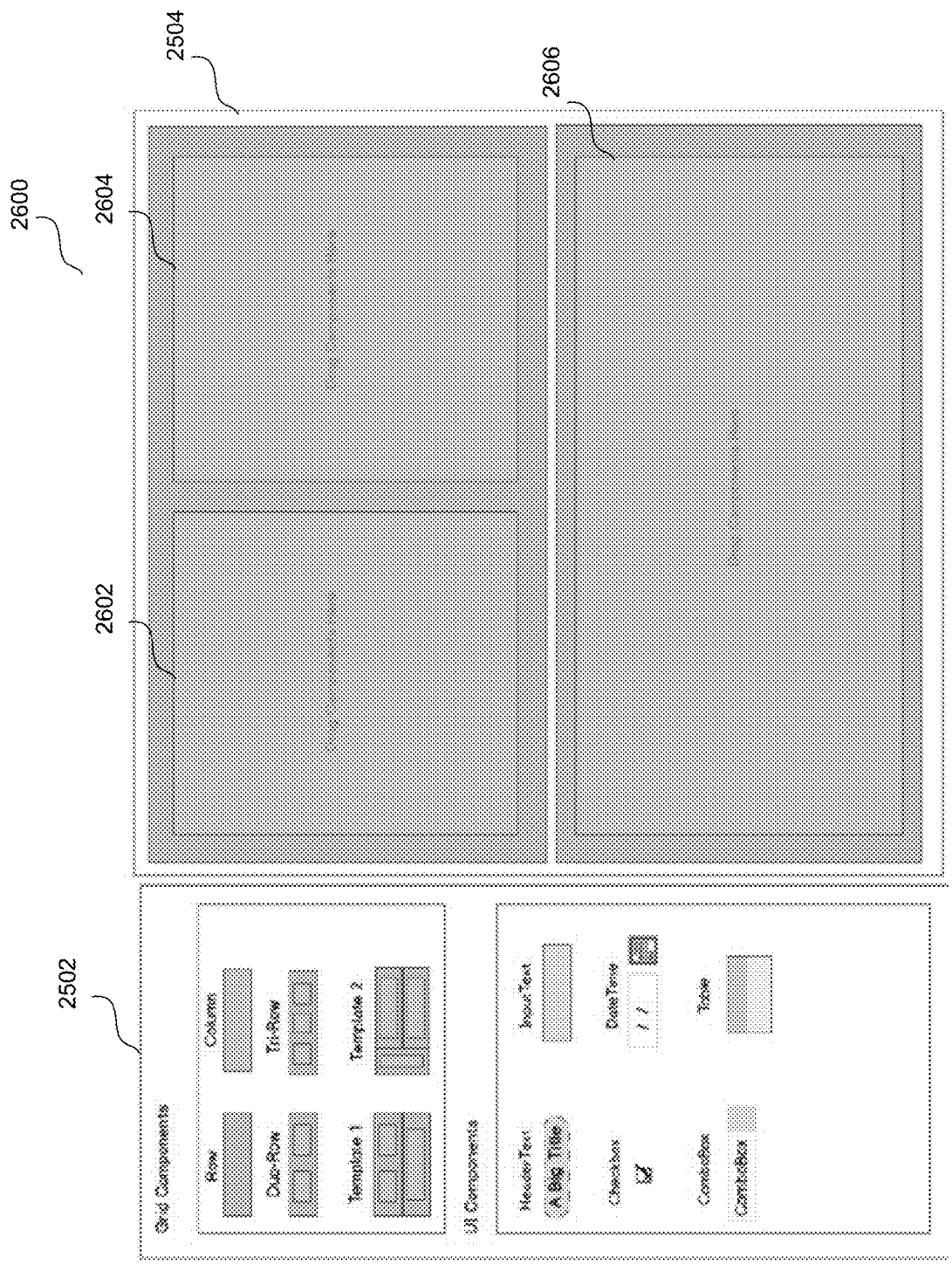
Figure 27:
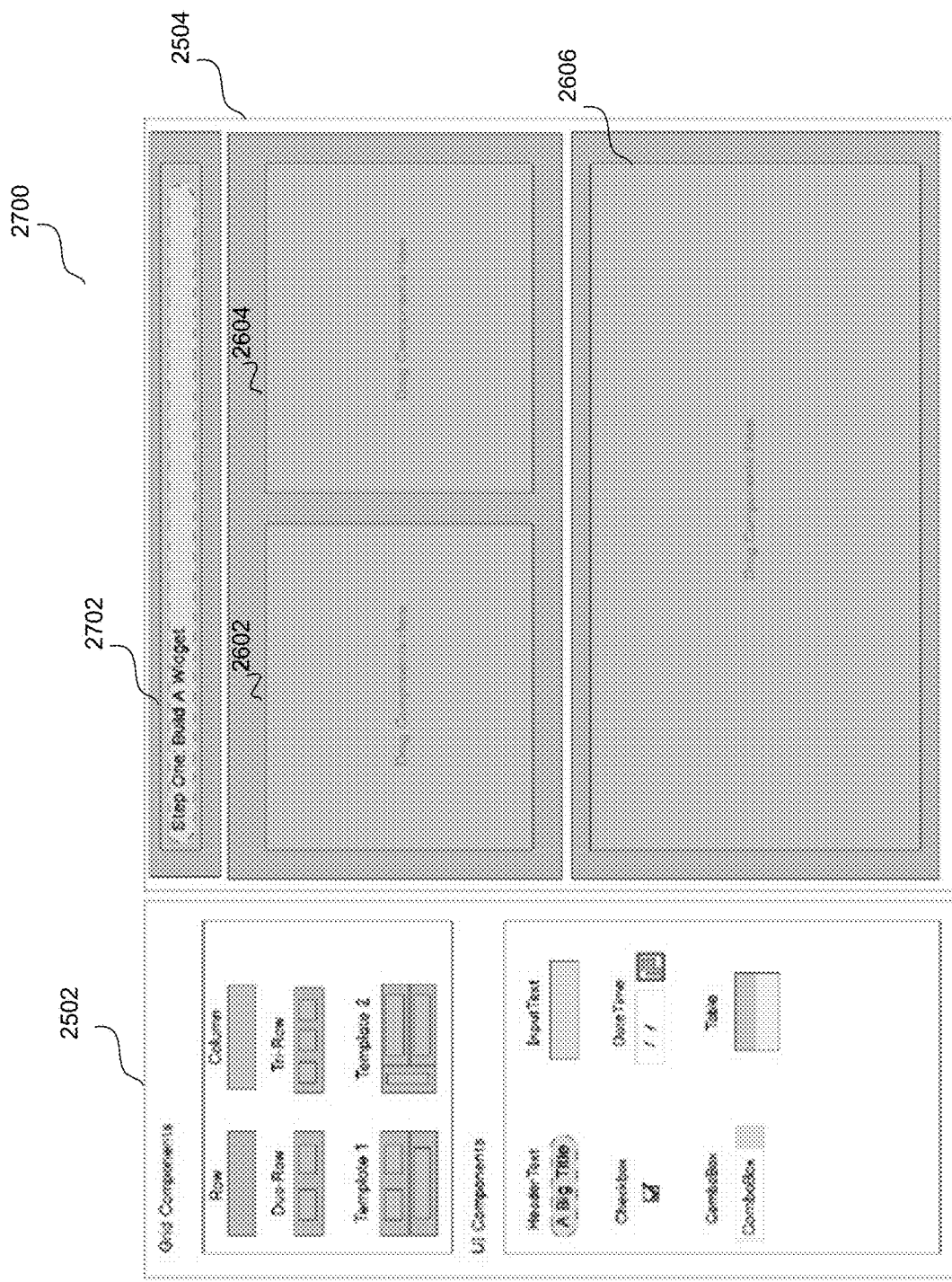
Figure 28:
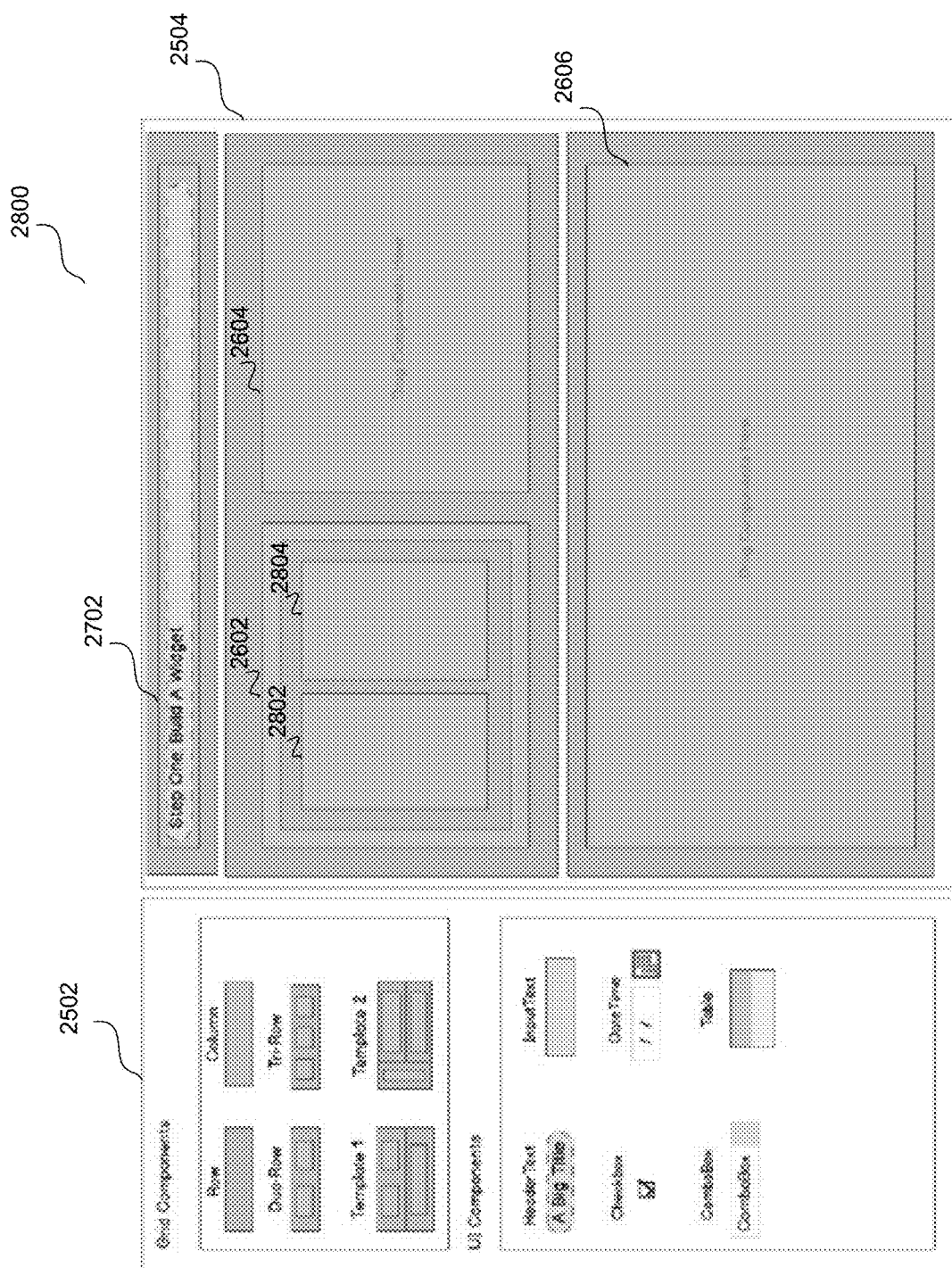
Figure 29:
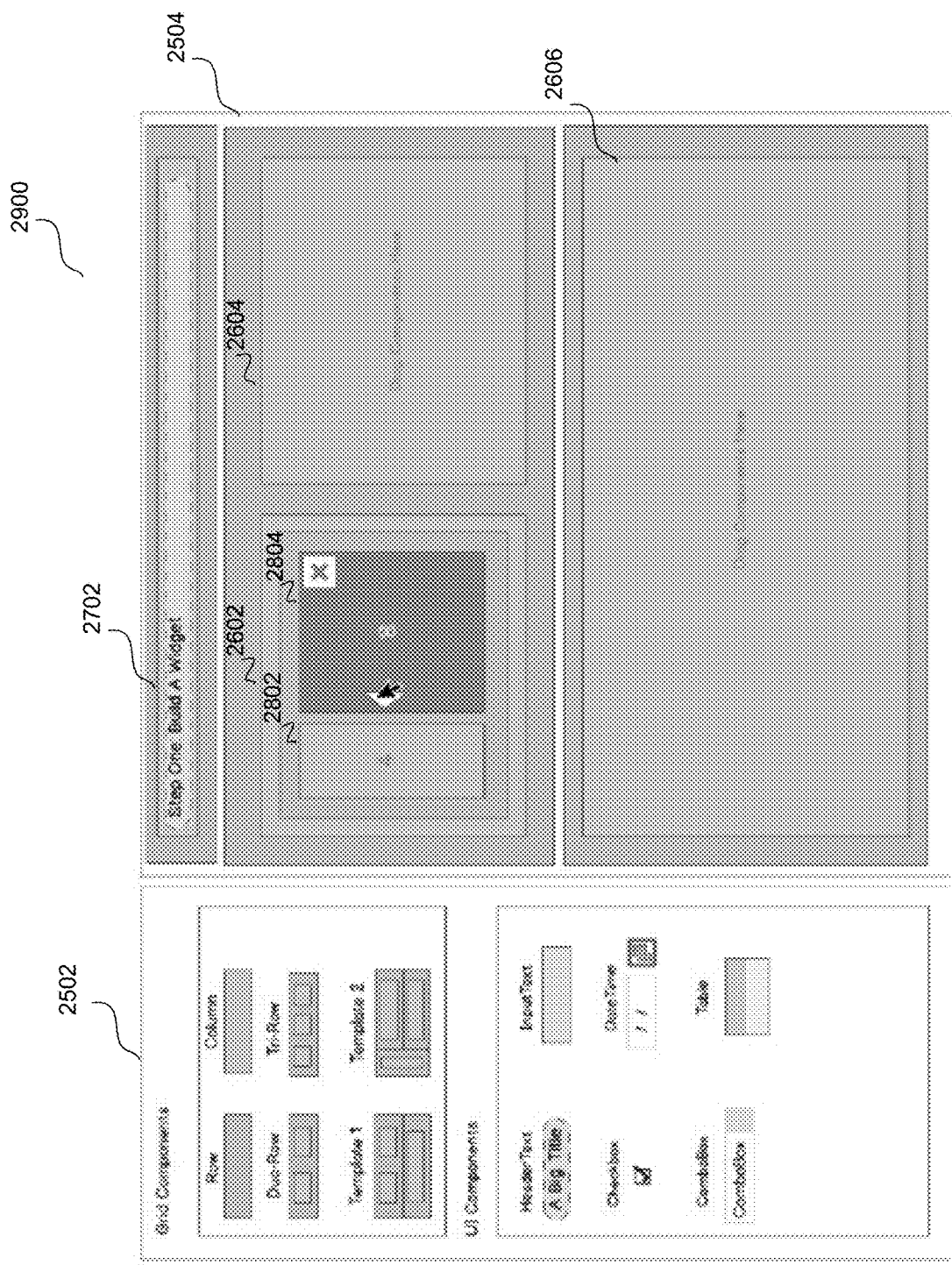
Figure 30:
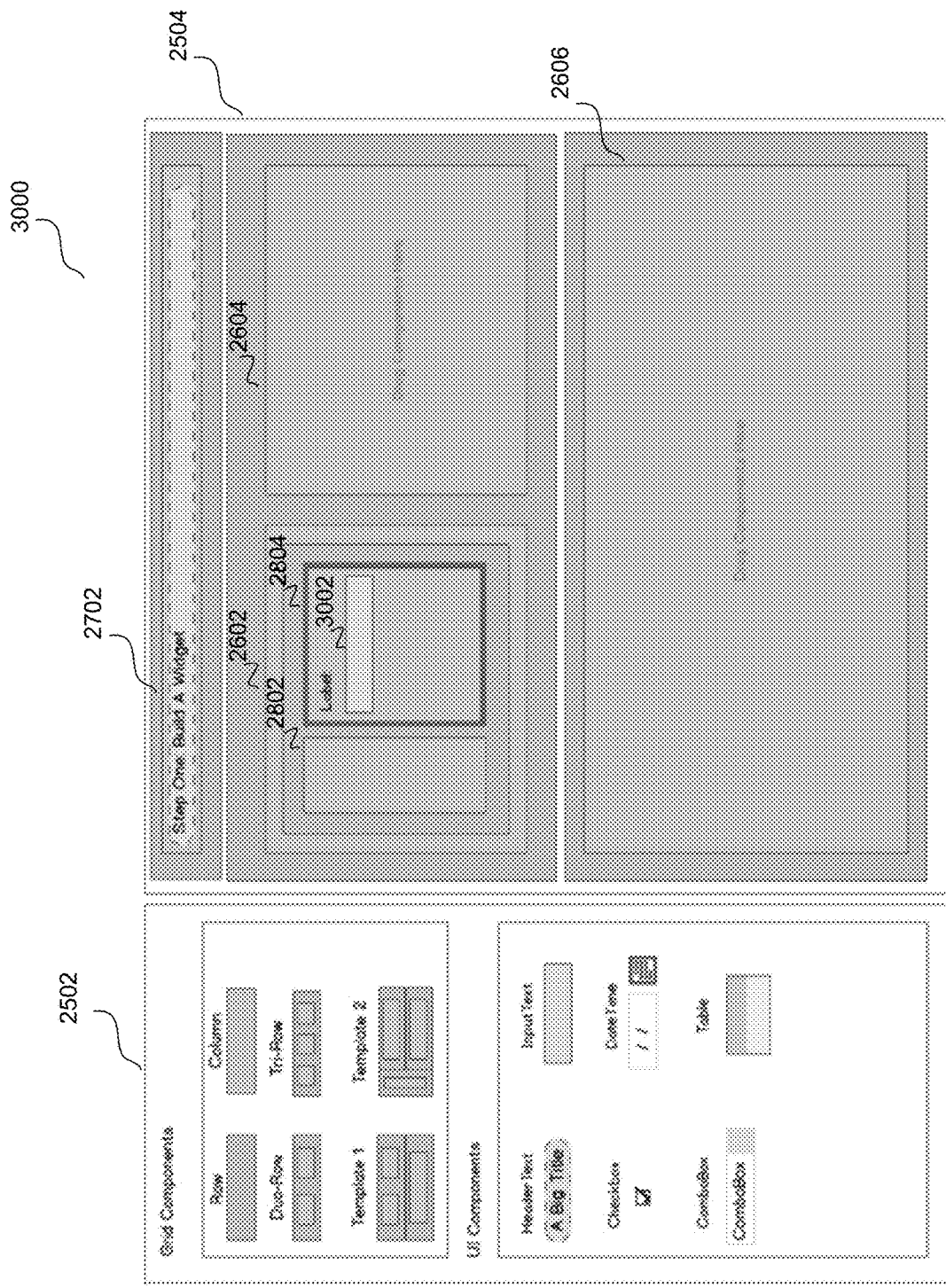
Figure 31:
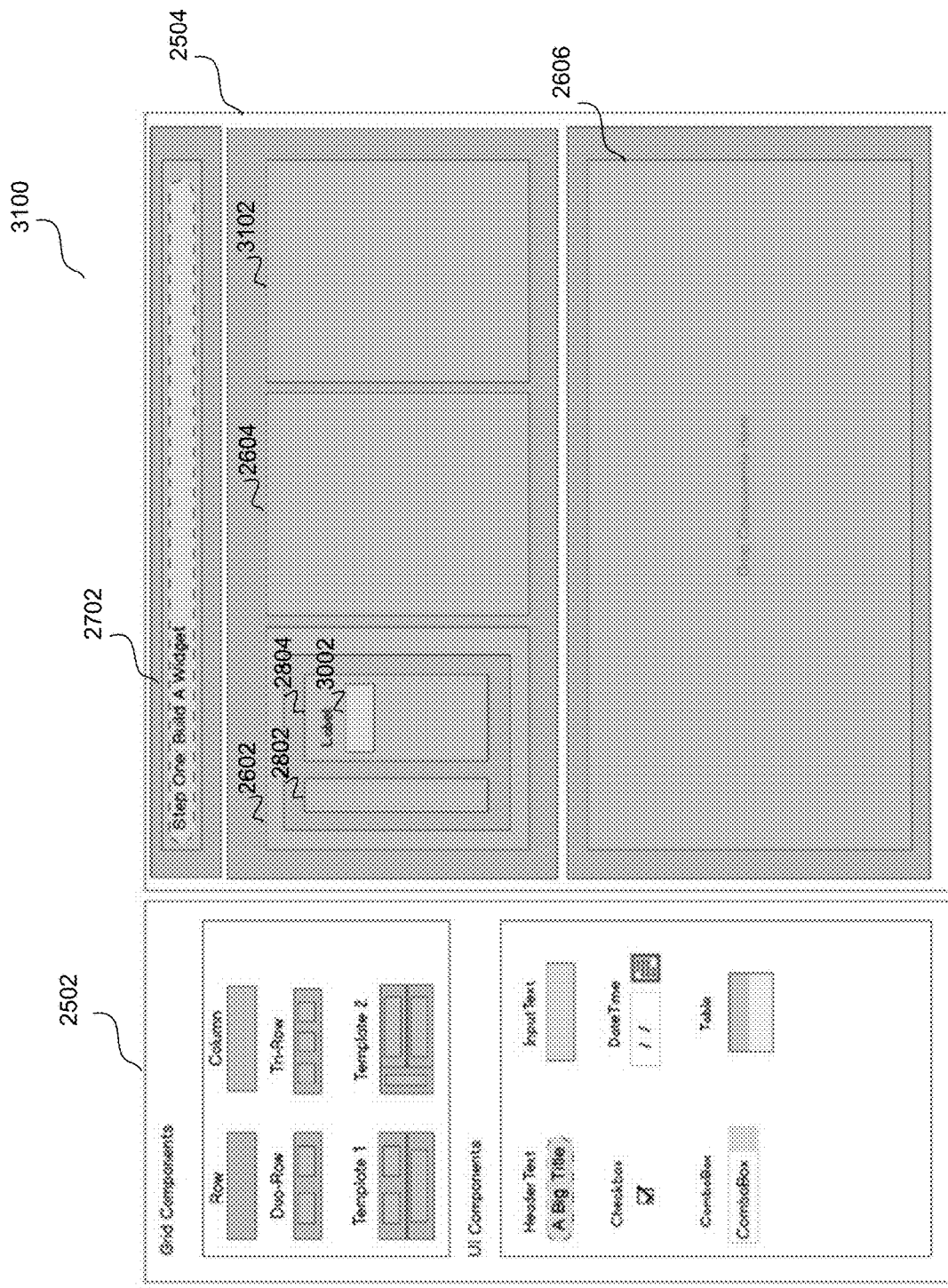

In order to perform styling, users may select and edit any relevant properties (e.g., color, size, etc.) of a component. One embodiment may further set theme values or perform conditional formatting (e.g., if value is "HIGH" make text "RED"). FIGS. 22 and 23 illustrate screens 2200 and 2300 that provide alternative ways to show styling in the property inspector. Screen 2200 of FIG. 22 corresponds to a simple component with style related properties which are shown directly in the standard properties list. Screen 2300 of FIG. 23 illustrates the option of sliding in a "style" page with additional details if it is desired to set a number of style related properties and there is not enough room on the properties page. Screen 2400 of FIG. 24 illustrates an example of using the "Add Component Help" option in the properties tab. Checking this option allows for entering help information to be provided to a user that is working with a component.

In one embodiment, dragging and dropping components from a components palette onto a canvas results in a corresponding textual functionality to be concurrently configured. Alternatively or additionally, a user may modify the textual functionality to configure the canvas. FIGS. 25-31 illustrate a sequence of example screens 2500, 2600, 2700, 2800, 2900, 3000, and 3100 as a user builds a UI on the canvas.

In screen 2500, the user is provided with a components palette 2502 on the left and a single container 2504 on the canvas. For screen 2500, the following functionality is concurrently configured:

```
<div class="main_container">
    ...
</div>
```

In this functionality, a class "main-container" implements container 2504. Screen 2600 illustrates the result of dragging and dropping a three panel template into container 2504, and the functionality updates as:

```
<div class="main_container">
    <div class="oj-row">
        <div class="oj-col sm-6">
        </div>
        <div class="oj-col sm-6">
        </div>
    </div>
    <div class="oj-row">
        <div class="oj-col sm-12">
        </div>
    </div>
</div>
```

In this functionality, the three panel template has two rows and each row is implemented by a class "oj-row." The first row includes two equally wide panels 2602 and 2604, where each panel is implemented by a class "oj-col sm-6," thus occupying 6 logical columns in that row. The second row includes a single panel 2606 implemented by a class "oj-col sm-12," thus occupying all of the 12 logical columns in that row.

Screen 2700 illustrates the result of dragging and dropping a "Header Text" component 2702 in a new row at the top of the canvas. Component 2702 includes a text box, and the title "Step One: Build a Widget" is entered in the text box by the user. Accordingly, the functionality updates as:

```
<div class="main_container">
    <div class="oj-row">
        <div class="oj-col sm-12">
            <h1>Step One: Build A Widget</h1>
        </div<
    <div class="oj-row">
        <div class="oj-col sm-6">
        </div>
        <div class="oj-col sm-6">
        </div>
    </div>
    <div class="oj-row">
        <div class="oj-col sm-12">
        </div>
    </div>
</div>
```

In this functionality, component 2702 is implemented by a class "oj-row" defining a new row in the canvas and a class "oj-column sm-12" that configures component 2702 to occupy all of the 12 logical columns in this row.

Screen 2800 illustrates the result of dragging and dropping a two panel template into panel 2602, thus creating two equally wide panels 2802 and 2804 within the 12 column grid architecture of panel 2602. Accordingly, the functionality updates as:

```
<div class="main_container">
    <div class="oj-row">
        <div class="oj-col sm-12">
            <h1>Step One: Build A Widget</h1>
        </div>
    </div<
    <div class="oj-row">
        <div class="oj-col sm-6">
            <div class="oj-row">
                <div class="oj-col sm-6">
                </div>
                <div class="oj-col sm-6">
```

```
            </div>
          </div>
        </div>
        <div class="oj-col sm-6">
        </div>
      </div>
      <div class="oj-row">
        <div class="oj-col sm-12">
        </div>
      </div>
</div>
```

In this functionality, each one of panels 2802 and 2804 is implemented by a class "oj-col sm-6," thus occupying 6 of the 12 logical columns within panel 2602. Screen 2900 illustrates the result of resizing panel 2804 to occupy 8 logical columns within panel 2602, thereby causing panel 2802 to shrink to occupy the remaining 4 logical columns within panel 2602. Accordingly, the functionality updates as:

```
<div class="main_container">
  <div class="oj-row">
    <div class="oj-col sm-12">
      <h1>Step One: Build A Widget</h1>
    </div>
  </div<
  <div class="oj-row">
    <div class="oj-col sm-6">
      <div class="oj-row">
        <div class="oj-col sm-4">
        </div>
        <div class="oj-col sm-8">
        </div>
      </div>
    </div>
    <div class="oj-col sm-6">
    </div>
  <div class="oj-row">
    <div class="oj-col sm-12">
    </div>
  </div>
</div>
```

Screen 3000 illustrates the result of dragging and dropping an "Input Text" component 3002 into panel 2804. "Input Text" component 3002 is configured to receive input text in the UI. Accordingly, the functionality updates as:

```
<div class="main_container">
  <div class="oj-row">
    <div class="oj-col sm-12">
      <h1>Step One: Build A Widget</h1>
    </div>
  </div<
  <div class="oj-row">
    <div class="oj-col sm-6">
      <div class="oj-row">
        <div class="oj-col sm-4">
        </div>
        <div class="oj-col sm-8">
          <label for="input1">Label:</label>
          <input id="input1" data-bind="ojComponent:
{component: 'ojInputText'}">
        </div>
      </div>
    </div>
    <div class="oj-col sm-6">
    </div>
  <div class="oj-row">
    <div class="oj-col sm-12">
    </div>
```
```
  </div>
</div>
```

Screen 3100 illustrates the result of dragging and dropping a new column to the right of panel 2604, thus creating panel 3102 in the same row as panels 2602 and 2604, and causing panels 2602 and 2604 to shrink so that panels 2602, 2604, and 3102 are equally wide. Resizing panel 2602 also causes the components therein to resize. That is, panels 2802 and 2804 shrink as panel 2602 shrinks, but continue to occupy the same number of logical columns within panel 2602 (i.e., 4 logical columns occupied by panels 2802 and 8 logical columns occupied by panel 2804). Similarly, component 3002 shrinks as panel 2804 shrinks. Accordingly, the functionality updates as:

```
<div class="main_container">
  <div class="oj-row">
    <div class="oj-col sm-12">
      <h1>Step One: Build A Widget</h1>
    </div>
  </div<
  <div class="oj-row">
    <div class="oj-col sm-4">
      <div class="oj-row">
        <div class="oj-col sm-4">
        </div>
        <div class="oj-col sm-8">
          <label for="input1">Label:</label>
          <input id="input1" data-bind="ojComponent:
{component: 'ojInputText'}">
        </div>
      </div>
    </div>
    <div class="oj-col sm-4">
    </div>
    <div class="oj-col sm-4">
    </div>
  </div>
  <div class="oj-row">
    <div class="oj-col sm-12">
    </div>
  </div>
</div>
```

In this functionality, each of panels 2602, 2604, and 3102 occupies 4 logical columns in the same row.

Variations

One embodiment provides "UI-first" functionality out of the box, meaning when a user creates a new application, the initial user assistance asks the user to first create the UI as opposed to first creating or connecting to a data source. Customers can create a UI and hook it up to data later. One embodiment allows a user to create a blank screen and build the UI manually.

In an alternative embodiment, a few templatized UI types are provided out of the box, including layouts and a default set of screens. For example, when addressing a number of different use cases, the user is asked up front which one of the use cases are concerned. As such, business users that are not developers/designers are not burdened with manually creating visual styling. Once the user selects a UI type, they are provided with a starting screen and then some customization options. For example, for Software as a Service ("SaaS") integration, the template choices may be the various License Activation File ("LaF") options within Oracle Corp., so that the user can automatically match up their application with what it will be integrated into. SaaS is a software distribution model in which applications are hosted by a vendor or service provider and made available to customers over a network (e.g., over the Internet).

One embodiment provides "edit in place" functionality. For example, when a user moves the mouse over a template, a color selector appears and allows for trying out different options, and each selected option is applied to the template behind the color selector. Such color palette functionality may be implemented, for example, for SaaS integration, and may be determined by what SaaS application the extension would be integrated into.

In one embodiment, the initial screen provides a persistent component palette on the left side, and the workspace/canvas is provided on the right. The page provides an invitation to immediately start customizing or adding a UI. There is a content area that can be dragged in. The textual and image elements that are provided in a template have clear affordances for editing. Accordingly, the screen provides desirable "out of the box" and "first time use" experience for users, as well as user assistance designed within the UI. Upon selecting the button to initialize or customize a UI, the editing UI appears right above it. It provides a number of settings, and the less frequently used settings are a click away on submenus. The changes to the UI occur in real time; meaning there is no "Apply" or "Save" button. Accordingly, when getting into some of the more complex settings, being able to immediately see the change allows users to "learn by doing" in a very efficient fashion.

One embodiment provides direct manipulation functionality. For example, users can edit a label by typing right into it. Direct manipulation may be implemented for some components (e.g., text fields) but not for all components. While the user is free to just enter text in the label, there is an unobtrusive formatting toolbar that appears just above the field. Unobtrusiveness may be provided by diligence in configuring size, position, and visual persistence of toolbars so that they do not interfere with the user's work.

One embodiment provides drag and drop functionality from the component palette to the canvas. When users drag an item, the embodiment appears to be removing it from the component palette instead of creating a ghosted, draggable copy of it. The size and shape of the item in the palette may be configured to make it feel grabbable and suitable for picking up and dragging. Same drag and drop functionality and feel may be provided on a touchscreen. A two column layout may be used to allow for more items above the fold (i.e., the top area of the UI that is immediately visible when a UI is first provided and before scrolling).

In one embodiment, after an image item is dragged and dropped on the canvas, a placeholder appears on the canvas to hold the space in case the user is dragging several elements one after the other and then going back to fill in the details for each element. The embodiment may not pop up an "image uploader" when the user drops an item, but that functionality is only a click away. The image uploader is a modal, popup UI affordance that appears when an Image component is dropped onto the canvas. It allows the user to select an image or upload a new one.

In one embodiment, clicking an image (e.g., an HTML image element including a link to the image itself so that it can be shown, along with sizing details and accessibility information) gives the user a palette of customizations with a populated set of options, and changing a setting shows the changes immediately (e.g., in real time). This UI pattern is applicable, for example, for supporting extensive customization/styling of components.

One embodiment provides hierarchical configuration menu settings that provide a variety of spacing options on a submenu for a selected component. Such options are applicable, for example, when supporting deep customization.

One embodiment provides direct image manipulation. For example, when an image object is selected, the user may resize (e.g., via a handle at bottom right), move (e.g., via a grab handle at top center), delete (e.g., via an X button at top right), and/or move/copy to another page (e.g., via an arrow at top left).

One embodiment provides a "pages" tab (e.g., on the top navigation bar) which includes a list of pages. The user can add new pages in the pages tab. In one embodiment, there are a few canned (pre-configured) templates, with tooltip help describing what each of them is. A tooltip is a small box that provides information about an item that is being hovered over. The user can also nest pages by dragging a child page under a parent page. This influences the design of the UI's navigational menu.

In one embodiment, when dropping a target, visual affordances are provided for positioning a component. For example, a thin line appears to indicate where the user would be dropping the item.

One embodiment provides a "bundled" component that provides functionality out of the box but still allows for further customization within a modal context. For example, for customization of a multi-component template, the component palette becomes contextual to the item that is being edited. For example, when editing a Contact Form (a form that provides a user with the ability to get in touch), the palette only shows components that are applicable to a Contact Form. Users have the same drag-drop capabilities even though they are in a modal context.

One embodiment integrates a custom HTML component by providing a customizable block that occupies space on the canvas. A user can then enter custom code in the HTML component.

In one embodiment, users can switch to a different form factor (e.g., from a desktop to a phone), and the application reacts responsively while still allowing a user to edit in this environment.

One embodiment allows for creating and populating a data object. For example, the columns of data may be created across the top, and after that, the rows of data may be entered.

One embodiment allows for defining roles, users, and permissions. For example, one embodiment provides functionality to lock down what screens a user/role can see and/or edit.

One embodiment provides mode switching functionality when users need to preview different form factors. For example, when previewing, users can switch between iPad, iPhone, and browser-based form factors.

In one embodiment, object configurators are placed at the same position as an object. In an alternative embodiment, there is a persistent property inspector at a p[persistent location in the UI (e.g., on the right hand side of the UI)

One embodiment uses a constrained row-based layout manager. Using a constrained model allows for configuring a UI that does not "break" when rendered (e.g., UI elements do not run into one another, overlay or block one another, wrap in an odd way that renders them unusable, etc.). In addition, for groups of functionally-related elements (e.g., aspects of an address such as street, city, state, zip, etc.), the elements need to stay spatially grouped. Accordingly, the embodiment enforces certain constraints in the layout manager and uses panels so that when the UI resizes, the layout does not break and functionally related items stay spatially grouped.

One embodiment uses a grid management system for new screen templates where the user can select from a group of preset layout options. In one embodiment, the user is given the ability to either embed new components within an existing grid element, or place them in newly created elements. One embodiment allows a user to create their own grid management objects and then populate them, possibly with the option to start from some canned layout templates for known design patterns.

One embodiment provides a layout manager that highlights the layout elements when users are working with them, and these elements become the drop targets. There may be a variety of layout components such as containers and grid rows that users can drag onto the canvas and then populate.

Figure 32:
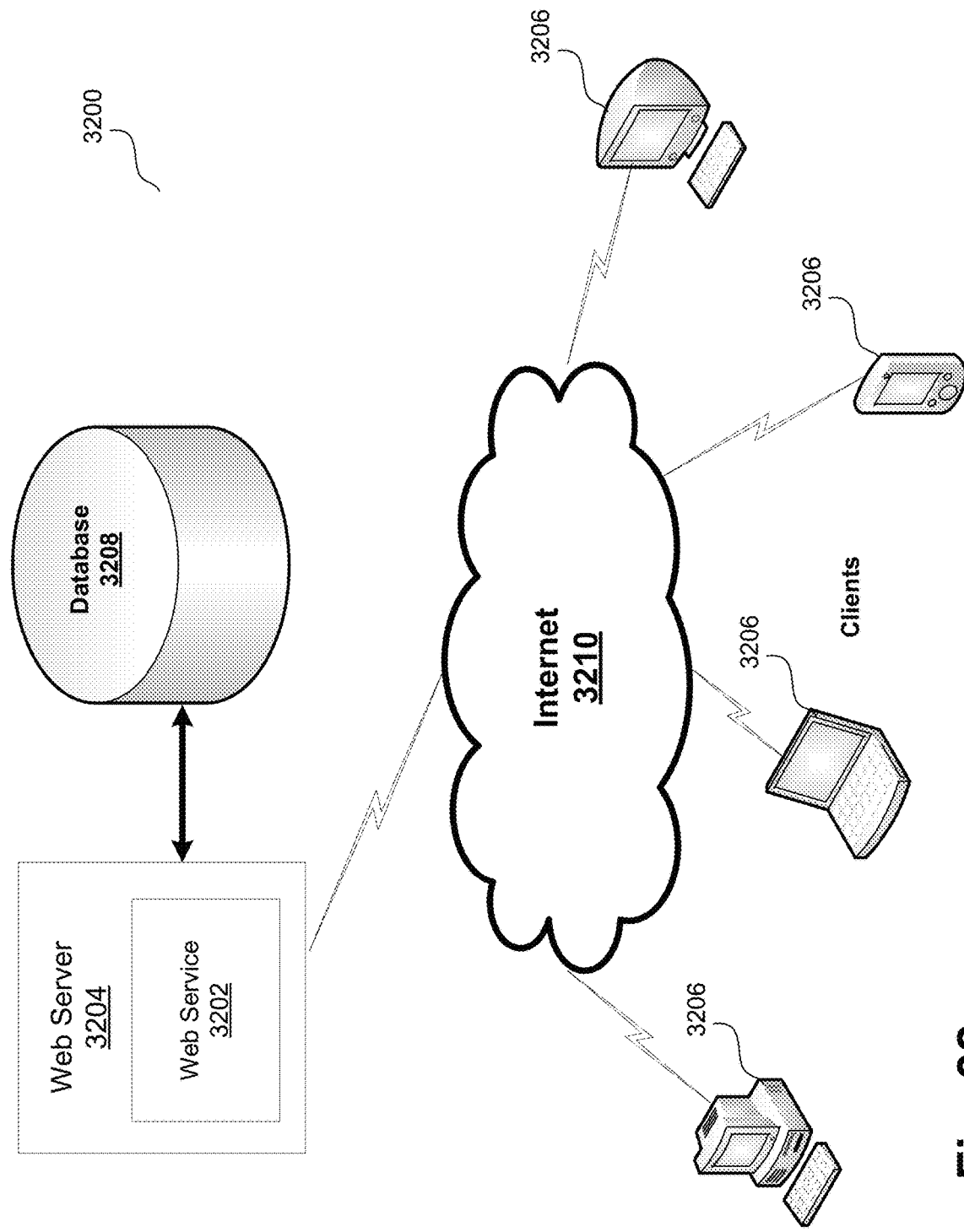
FIG. 32 illustrates an example block diagram for providing layout design functionality for a web service, according to embodiments of the present invention.

One embodiment is used to implement a UI for a web service. FIG. 32 is a block diagram 3200 that illustrates a plurality of clients 3206 that use the Internet 3210 to access a web service 3202 that is implemented on a web server 3204 (e.g., a WebLogic Server from Oracle Corp.) in one embodiment. Web service 3202 accesses a database 3208 which stores data for web service 3202 and/or for components/modules that may be used to design/configure a UI for web service 3202. Each client 3206 executes a browser or other functionality to allow a user to design/configure a UI or use the UI to interact with web service 3202.

Figure 33:
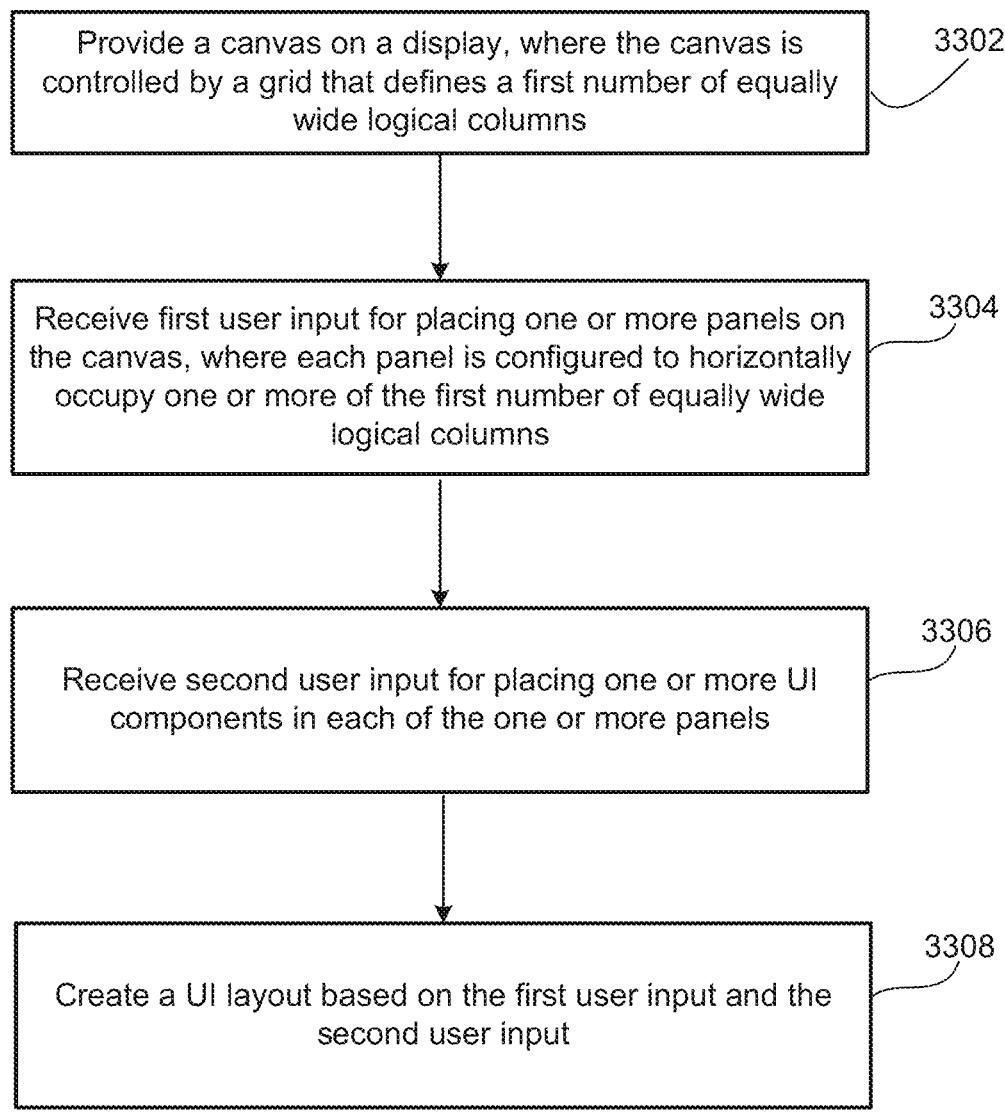
FIG. 33 is a flow diagram of the operation of the layout design module of FIG. 1 when performing layout design functionality in accordance with embodiments of the present invention.

FIG. 33 is a flow diagram of layout design module 16 of FIG. 1 when providing UI layout design functionality in accordance with embodiments of the present invention. In one embodiment, the functionality of the flow diagram of FIG. 33 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 3302, a canvas is provided on a display, where the canvas is controlled by a grid that defines a first number of equally wide logical columns. In one embodiment, each logical row in the canvas is split into the first number of equally wide logical columns.

At 3304, first user input is received for placing one or more panels on the canvas, where each panel is configured to horizontally occupy one or more of the first number of equally wide logical columns. In one embodiment, each panel is controlled by a panel grid that includes a second number of equally wide logical panel columns. In one embodiment, the second number is equal to the first number.

At 3306, second user input is received for placing one or more UI components in each of the one or more panels. In one embodiment, within each panel, each UI component is configured to horizontally occupy one or more of the second number of equally wide logical panel columns. In one embodiment, each UI component has a specified minimum width and a specified default width, both expressed in logical columns.

At 3308, a UI layout is created based on the first user input and the second user input.

In one embodiment, when the UI layout is rendered in a UI, each UI component horizontally occupies a same number of the equally wide logical panel columns on viewports of different sizes. In one embodiment, when the UI layout is rendered on a device and a viewport of the device is compressed, at least one UI component slides under another UI component.

In one embodiment, when the UI layout is rendered in a UI, each panel horizontally occupies a same number of the equally wide logical columns on viewports of different sizes. In one embodiment, when the UI layout is rendered on a device and a viewport of the device is compressed, at least one panel slides under another panel.

In one embodiment, when a new panel is added in a logical row whose logical columns are occupied by one or more existing panels, the logical columns are evenly split among the new panel and the existing panels.

In one embodiment, when a new panel is dragged from a component palette onto the canvas that includes one or more existing panels, the UI layout design functionality allows for the new panel to be dropped in a drop target area configured relative to the one or more existing panels. In one embodiment, the drop target area is above, below, to the left, or to the right of one of the one or more existing panels. In one embodiment, the drop target area is above, below, to the left, or to the right of an entire area occupied by the one or more existing panels.

As disclosed, embodiments provide a layout design system that allows users to create compelling responsive applications without needing to understand responsive design or corresponding technical underpinnings. Embodiments provide a "pick-up-and-use" layout system that requires little to no training or user assistance. In one embodiment, there is no need for alignment, spacing, or positioning tooling, and the user can design well-formed UIs using just a mouse (e.g., with no additional tooling, keyboard shortcuts, etc.). Further, the layout design system provides a set of constraints that prevent the user from creating a "bad UI." Accordingly, applications built in such layout design system result in a desirable end product and improved end user satisfaction.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to provide user interface (UI) layout design functionality, the providing comprising:

providing a canvas on a display that is controlled by a grid container with one or more logical rows that are split into a fixed number of equally wide first logical columns, wherein a first logical column specifies a width of a column of the grid container and the canvas is part of a constrained row-based layout manager;

receiving first user input for placing at least two panels on the canvas in the grid container, each panel occupying a first of the logical rows and multiple of the first logical columns of the first logical row, wherein the panels are positioned side by side in the grid container, and the first logical row and first logical columns that each panel occupies define a size for each panel, each panel is controlled by a panel grid embedded in the grid container, the panel grid including a fixed number of equally wide logical panel columns, a logical panel column specifying a width of a column of a panel, the fixed number of logical panel columns that comprise each panel grid is equal to the fixed number of first logical columns that comprise the grid container, and a first of the panels is configured to occupy at least two of the first logical columns of the first logical row but less than the fixed number of first logical columns;

receiving second user input for placing one or more UI components in each of the at least two panels, wherein, when placed in a given panel, each UI component is configured to horizontally occupy one or more of the equally wide logical panel columns of the given panel, and UI components placed in the given panel are grouped for responsive rendering; and creating a UI layout comprising the UI components configured according to panel placement for each UI component based on the first user input and the second user input, wherein, creating the UI layout comprises generating software objects that implement the grid container, placed panels, and placed UI components in a document object model for the UI layout, the generated software objects corresponding to the at least two panels comprise at least a first row object for the first logical row, a first column object for the first logical columns that the placed first panel occupies, and a second column object for the first logical columns that the placed second panel occupies, when the created UI layout and the generated software objects are rendered in a first viewport, a first UI layout renders the first logical columns for the first logical row and the at least two panels side to side in a one-dimensional array, when the created UI layout and the generated software objects are rendered in a second viewport, a second UI layout renders the first logical columns for the first logical row and the at least two panels side to side and top to bottom in a two-dimensional array, and a number of the rendered first logical columns remains constant for the first UI layout and the second UI layout, the number of rendered first logical columns that remains constant for the first UI layout and the second UI layout comprises the fixed number of first logical columns.

2. The computer readable medium of claim 1, wherein each UI component has a specified minimum width and a specified default width, both expressed in a number of the first logical columns or a number of logical panel columns.

3. The computer readable medium of claim 1, wherein, when the UI layout is rendered, each panel horizontally occupies a same number of the first logical columns on viewports of different sizes.

4. The computer readable medium of claim 1, wherein, when the UI layout is rendered on a device and a viewport of the device is compressed, at least one panel slides under another panel.

5. The computer readable medium of claim 1, wherein, when a new panel is placed on the canvas in a logical row of the grid container whose logical columns are occupied by one or more existing panels, the logical columns are evenly split among the new panel and existing panels.

6. The computer readable medium of claim 1, wherein, when a new panel is dragged from a component palette onto the canvas that includes one or more existing panels, the UI layout design functionality allows for the new panel to be dropped in a drop target area configured relative to the one or more existing panels, and the drop target area is above, below, to the left, or to the right of one of the one or more existing panels, or the drop target area is above, below, to the left, or to the right of an entire area occupied by the one or more existing panels.

7. The computer readable medium of claim 1, wherein the providing further comprises:

responsively rendering the UI layout based on viewport, wherein, when the first UI layout is rendered in the first viewport, the first logical columns for the first logical row and the at least two panels are rendered side to side in a one-dimensional array, and, when the second UI layout is rendered in the second viewport, the first logical columns for the first logical row and the at least two panels are rendered side to side and top to bottom in a two-dimensional array.

8. The computer readable medium of claim 7, wherein the responsive rendering of the first UI layout in the first viewport and the second UI layout in the second viewport is defined by a cascading style sheet.

9. The computer readable medium of claim 7, wherein, the first of the responsively rendered panels comprises three UI components, when the first UI layout is rendered in the first viewport the first panel and three UI components are responsively rendered side to side in the one-dimensional array, and when the second UI layout is rendered in the second viewport the first panel spans multiple dimensions of the two-dimensional array and the three UI components are rendered side to side and top to bottom in the two-dimensional array.

10. The computer readable medium of claim 1, wherein the generated software objects correspond to hypertext transfer protocol (HTTP) tags.

11. The computer readable medium of claim 1, wherein the grid container object is a parent of the first row object and the first row object is a parent of the first column object and the second column object in the document object model, and a width of the first row object comprises the fixed number of first logical columns.

12. The computer readable medium of claim 11, wherein a width of the first panel is defined by a numeric attribute of the first column object that corresponds to a number of first logical columns the placed first panel occupies, and a percentage of the row object that is occupied by the first panel comprises a ratio of the numeric attribute of the first column object and the number of first logical columns.

13. The computer readable medium of claim 11, wherein creating the UI layout comprises generating a second row object with a width comprising the fixed number of logical panel columns and a third row object with a width comprising the fixed number of logical panel columns, the first column object that corresponds to the first panel is a parent of the second row object in the document object model such that the second row object implements the logical panel columns of the first panel, and the second column object that corresponds to the second panel is a parent of the third row object in the document object model such that the third row object implements the logical panel columns of the second panel.

14. The computer readable medium of claim 1, wherein, at least two user interface components are placed in the first panel side to side, the first UI layout renders the logical panel columns for the first panel and the at least two user interface components side to side in a one-dimensional array, and the second UI layout renders the logical panel columns for the first panel and the at least two user interface components side to side and top to bottom in a two-dimensional array.

15. The computer readable medium of claim 14, wherein a number of the rendered logical panel columns remains constant for the first UI layout and the second UI layout, the number of rendered logical panel columns that remains constant for the first UI layout and the second UI layout comprises the fixed number of logical panel columns.

16. The computer readable medium of claim 1, wherein the fixed number of first logical columns and the fixed number of logical panel columns is 12.

17. A method of providing user interface (UI) layout design functionality, the method comprising:
providing a canvas on a display that is controlled by a grid container with one or more logical rows that are split into a fixed number of equally wide first logical columns, wherein a logical column specifies a width of a column of the grid container and the canvas is part of a constrained row-based layout manager;
receiving first user input for placing at least two panels on the canvas in the grid container, each panel occupying a first of the logical rows and multiple of the first logical columns of the first logical row, wherein,
the panels are positioned side by side in the grid container, and the first logical row and first logical columns that each panel occupies define a size for each panel,
each panel is controlled by a panel grid embedded in the grid container, the panel grid including a fixed number of equally wide logical panel columns, a logical panel column specifying a width of a column of a panel,
the fixed number of logical panel columns that comprise each panel grid is equal to the fixed number of first logical columns that comprise the grid container, and
a first of the panels is configured to occupy at least two of the first logical columns of the first logical row but less than the fixed number of first logical columns;
receiving second user input for placing one or more UI components in each of the at least two panels, wherein, when placed in a given panel, each UI component is configured to horizontally occupy one or more of the number of equally wide logical panel columns of the given panel, and UI components placed in the given panel are grouped for responsive rendering; and
creating a UI layout comprising the UI components configured according panel placement for each UI component based on the first user input and the second user input, wherein,
creating the UI layout comprises generating software objects that implement the grid container, placed panels, and placed UI components in a document object model for the UI layout,
the generated software objects corresponding to the at least two panels comprise at least a first row object for the first logical row, a first column object for the first logical columns that the placed first panel occupies, and a second column object for the first logical columns that the placed second panel occupies,
when the created UI layout and the generated software objects are rendered in a first viewport, a first UI layout renders the first logical columns for the first logical row and the at least two panels side to side in a one-dimensional array,
when the created UI layout and the generated software objects are rendered in a second viewport, a second UI layout renders the first logical columns for the first logical row and the at least two panels are rendered side to side and top to bottom in a two-dimensional array, the first logical columns in the second UI layout being rendered as logical columns in the two-dimensional array, and
a number of the rendered first logical columns remains constant for the first UI layout and the second UI layout, the number of rendered first logical columns that remains constant for the first UI layout and the second UI layout comprises the fixed number of first logical columns.

18. A system for providing user interface (UI) layout design functionality, the system comprising:
a processor coupled to memory, wherein the processor is configured to:
provide a canvas on a display that is controlled by a grid container with one or more logical rows that are split into a fixed number of equally wide first logical columns, wherein a logical column specifies a width of a column of the grid container and the canvas is part of a constrained row-based layout manager;
receive first user input for placing at least two panels on the canvas in the grid container, each panel occupying a first of the logical rows and multiple of the first logical columns of the first logical row, wherein,
the panels are positioned side by side in the grid container, and the first logical row and first logical columns that each panel occupies define a size for each panel,
each panel is controlled by a panel grid embedded in the grid container, the panel grid including a fixed number of equally wide logical panel columns, a logical panel column specifying a width of a column of a panel,
the fixed number of logical panel columns that comprise each panel grid is equal to the fixed number of first logical columns that comprise the grid container, and
a first of the panels is configured to occupy at least two of the first logical columns of the first logical row but less than the fixed number of first logical columns;
receive second user input for placing one or more UI components in each of the at least to panels, wherein, when placed in a given panel, each UI component is configured to horizontally occupy one or more of the number of equally wide logical panel columns of the given panel, and UI components placed in the given panel are grouped for responsive rendering; and
create a UI layout comprising the UI components configured according panel placement for each UI component based on the first user input and the second user input, wherein,
creating the UI layout comprises generating software objects that implement the grid container, placed panels, and placed UI components in a document object model for the UI layout,
the generated software objects corresponding to the at least two panels comprise at least a first row object for the first logical row, a first column object for the first logical columns that the placed first panel occupies, and a second column object for the first logical columns that the placed second panel occupies,
when the created UI layout and the generated software objects are rendered in a first viewport, a first UI layout renders the first logical columns for the first logical row and the at least two panels side to side in a one-dimensional array, the first logical columns in the first UI layout being rendered as logical columns in the one-dimensional array, when the created UI layout and the generated software objects are rendered in a second viewport, a second UI layout renders the first logical columns for the first logical row and the at least two panels side to side and top to bottom in a two-dimensional array, and a number of the rendered first logical columns remains constant for the first UI layout and the second UI layout, the number of rendered first logical columns that remains constant for the first UI layout and the second UI layout comprises the fixed number of first logical columns.

\* \* \* \* \*